(12) United States Patent
Mochizuki

(10) Patent No.: US 10,209,417 B2
(45) Date of Patent: *Feb. 19, 2019

(54) ACHROMATIC DYE-BASED HIGHLY-TRANSMISSIVE POLARIZATION ELEMENT, AND POLARIZATION PLATE

(71) Applicants: Nippon Kayaku Kabushiki Kaisha, Tokyo (JP); Polatechno Co., Ltd., Niigata Prefecture (JP)

(72) Inventor: Noriaki Mochizuki, Tokyo (JP)

(73) Assignees: Nippon Kayaku Kabushiki Kaisha, Tokyo (JP); Polatechno Co., Ltd., Niigata Prefecture (JP)

( * ) Notice: Subject to any disclaimer, the term of this patent is extended or adjusted under 35 U.S.C. 154(b) by 547 days.

This patent is subject to a terminal disclaimer.

(21) Appl. No.: 14/781,699

(22) PCT Filed: Dec. 4, 2013

(86) PCT No.: PCT/JP2013/082627
§ 371 (c)(1),
(2) Date: Oct. 1, 2015

(87) PCT Pub. No.: WO2014/162635
PCT Pub. Date: Oct. 9, 2014

(65) Prior Publication Data
US 2016/0041321 A1    Feb. 11, 2016

(30) Foreign Application Priority Data
Apr. 3, 2013 (JP) .................. 2013-077964

(51) Int. Cl.
*G02B 5/30* (2006.01)
*C09B 31/08* (2006.01)
(Continued)

(52) U.S. Cl.
CPC ............ *G02B 5/3033* (2013.01); *C09B 31/08* (2013.01); *C09B 35/037* (2013.01); *C09B 45/28* (2013.01);
(Continued)

(58) Field of Classification Search
CPC ............. B29D 11/00644; G02B 5/305; G02B 5/3033; G02F 1/133528; C09B 31/08;
(Continued)

(56) References Cited

U.S. PATENT DOCUMENTS 4,859,039 A * 8/1989 Okumura ............... G02B 5/205
359/487.02
5,122,887 A * 6/1992 Mathewson ........ G02F 1/13473
349/180
(Continued)

FOREIGN PATENT DOCUMENTS

JP    60-156759 A    8/1985
JP    64-5623 B2     1/1989
(Continued)

OTHER PUBLICATIONS

European communication dated Oct. 27, 2016 in corresponding European patent application No. 13881022.1.
(Continued)

*Primary Examiner* — Sophie Hon
(74) *Attorney, Agent, or Firm* — Nields, Lemack & Frame, LLC

(57) ABSTRACT

A polarization element, which is obtained from a base material containing a dichromatic dye formed from an azo compound, is characterized in that the single-body transmittance is 35-60%, and a* and b* values, which are acquired for a polarization element or a polarization plate using JIS·Z·8729, have an a* and b* absolute value that is: less than 1 in a single-body transmittance measurement; less than
(Continued)

2 when two sheets of the base material are arranged parallel to the absorbing axis direction and the a* and b* values are measured; and less than 2 when two sheets of the base material are arranged orthogonal to the absorbing axis direction and the a* and b* values are measured.

14 Claims, 1 Drawing Sheet

(51) Int. Cl.
    *C09B 45/28*     (2006.01)
    *C09B 56/08*     (2006.01)
    *C09B 35/037*     (2006.01)
    *G02B 1/08*     (2006.01)
    *G02F 1/1335*     (2006.01)

(52) U.S. Cl.
    CPC ............... *C09B 56/08* (2013.01); *G02B 1/08* (2013.01); *G02F 1/133528* (2013.01)

(58) Field of Classification Search
    CPC ....... C09B 35/037; C09B 45/28; C09B 56/04; C09B 56/08; Y10T 428/1041
    USPC ........................................................ 428/1.31
    See application file for complete search history.

(56) References Cited

U.S. PATENT DOCUMENTS

| | | |
|---|---|---|
| 5,926,310 A | 7/1999 | Tamura et al. |
| 6,235,064 B1 | 5/2001 | Ogino et al. |
| 6,552,849 B1 | 4/2003 | Furuhashi et al. |
| 6,606,136 B2 | 8/2003 | Matsumoto et al. |
| 6,790,490 B1 | 9/2004 | Oiso et al. |
| 7,931,072 B1 | 4/2011 | Kroliczek et al. |
| 2002/0063243 A1 | 5/2002 | Matsumoto et al. |
| 2003/0017326 A1* | 1/2003 | McGurran .............. B32B 27/20 428/323 |
| 2004/0218118 A1 | 11/2004 | Hayashi |
| 2007/0079740 A1 | 4/2007 | Sadamitsu et al. |
| 2007/0166483 A1 | 7/2007 | Sadamitsu |
| 2008/0094549 A1 | 4/2008 | Sadamitsu |
| 2009/0046224 A1 | 2/2009 | Iida et al. |
| 2009/0103013 A1 | 4/2009 | Taguchi |
| 2009/0122235 A1* | 5/2009 | Aminaka .......... G02F 1/133528 349/96 |
| 2011/0056863 A1* | 3/2011 | Sekiya ................. A61K 9/7061 206/524.1 |
| 2011/0089383 A1 | 4/2011 | Sadamitsu et al. |
| 2011/0091692 A1 | 4/2011 | Davidovits et al. |
| 2012/0170117 A1* | 7/2012 | Cho .................... G02B 5/3033 359/487.01 |
| 2014/0085721 A1 | 3/2014 | Mochizuki et al. |
| 2014/0218628 A1 | 8/2014 | Mochizuki |
| 2014/0218666 A1 | 8/2014 | Mochizuki |
| 2016/0041322 A1 | 2/2016 | Mochizuki |
| 2016/0047959 A1 | 2/2016 | Mochizuki |

FOREIGN PATENT DOCUMENTS

| | | |
|---|---|---|
| JP | 6-337312 A | 12/1994 |
| JP | 2622748 B2 | 6/1997 |
| JP | 9-302250 A | 11/1997 |
| JP | 11-218611 A | 8/1999 |
| JP | 11-281817 A | 10/1999 |
| JP | 2001-33627 A | 2/2001 |
| JP | 2001-311827 A | 11/2001 |
| JP | 2002-296417 A | 10/2002 |
| JP | 3357803 B2 | 12/2002 |
| JP | 2003-215338 A | 7/2003 |
| JP | 2004-251962 A | 9/2004 |
| JP | 2005-326713 A | 11/2005 |
| JP | 3881175 B2 | 2/2007 |
| JP | 2007-328324 A | 12/2007 |
| JP | 4033443 B2 | 1/2008 |
| JP | 2008-065222 A | 3/2008 |
| JP | 4162334 B2 | 10/2008 |
| JP | 4281261 B2 | 6/2009 |
| JP | 2009-192577 A | 8/2009 |
| JP | 4452237 B2 | 4/2010 |
| JP | 4662853 B2 | 3/2011 |
| JP | 2011-197600 A | 10/2011 |
| JP | 4825135 B2 | 11/2011 |
| JP | 2012-3172 A | 1/2012 |
| JP | 2013-57909 A | 3/2013 |
| JP | 2013-57910 A | 3/2013 |
| JP | 2013-174786 A | 9/2013 |
| WO | 2007/138980 A1 | 12/2007 |
| WO | 2007/148757 A1 | 12/2007 |
| WO | 2009/142192 A1 | 11/2009 |
| WO | 2009/156784 A1 | 12/2009 |
| WO | 2012/165223 A1 | 12/2012 |

OTHER PUBLICATIONS

Kinosei Shikiso no Oyo (Application of functional dye), First Edition, CMC Shuppan Co., Ltd., M. Irie, ed., p. 98-100, Jun. 27, 2002.
Senryo Kagaku (Chemistry of Dyes), Yutaka Hosoda, Gihodo Shuppan, Nov. 25, 1957.
International Search Report and Written Opinion dated Mar. 11, 2014 in corresponding PCT application No. PCT/JP2013/082627.
International Search Report and Written Opinion dated Mar. 11, 2014 in co-pending PCT application No. PCT/JP2013/082626.
International Search Report and Written Opinion dated Mar. 11, 2014 in co-pending PCT application No. PCT/JP2013/082625.
Office action dated Jan. 24, 2018 in co-pending U.S. Appl. No. 14/781,691.
Office action dated Jan. 25, 2018 in co-pending U.S. Appl. No. 14/781,714.
Final rejection dated Aug. 6, 2018 in co-pending U.S. Appl. No. 14/781,691.
Final rejection dated Aug. 6, 2018 in co-pending U.S. Appl. No. 14/781,714.
Notice of allowance dated Oct. 19, 2018 in co-pending U.S. Appl. No. 14/781,691.
Notice of allowance dated Oct. 19, 2018 in co-pending U.S. Appl. No. 14/781,714.

* cited by examiner

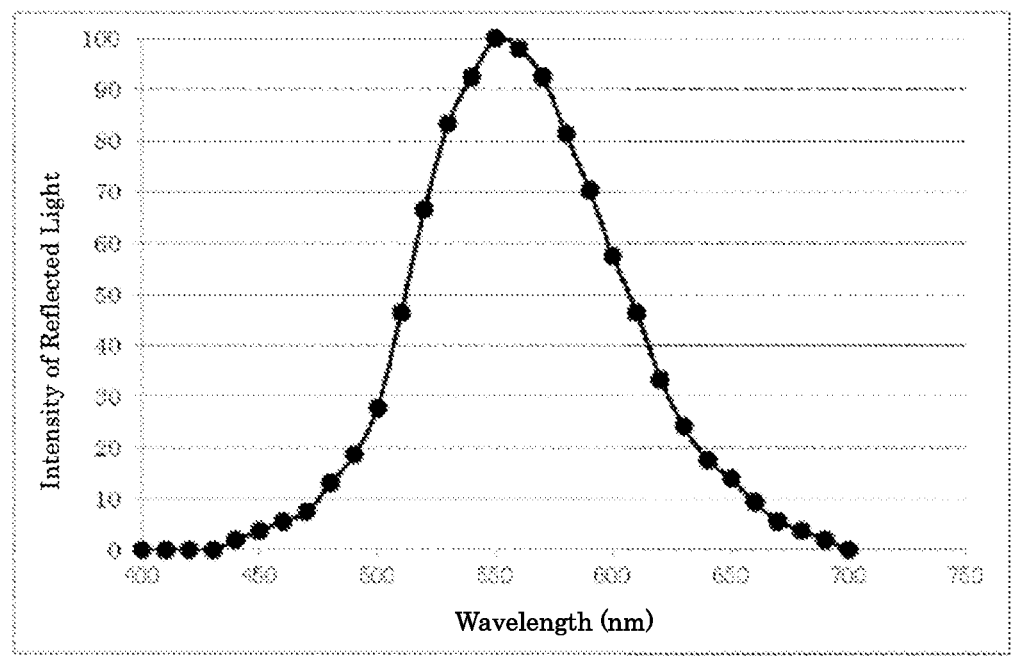

ically, a polarization element is manufactured by orienting iodine or a dichroic dye as dichroic pigments on a polyvinyl alcohol resin film by adsorption. A protective film comprising triacetyl cellulose or the like is adhered, via an adhesive layer, to at least one surface of the polarization element, to give a polarization plate, which is used in a liquid crystal display device or the like. A polarization plate that employs iodine as the dichroic pigment is called an iodine-based polarization plate, while a polarization plate that employs a dichroic dye as the dichroic pigment is called a dye-based polarization plate. Of these, dye-based polarization plates have high heat resistance, high durability against heat and humidity, and high stability, and also feature wide color selection through blending; on the other hand, there is a problem in that a polarization plate having the same degree of polarization as an iodine-based polarization plate will have comparatively lower transmittance, i.e. lower contrast. Accordingly, there is a desire for a polarization plate that maintains high durability, while offering a wide selection of colors, as well as having higher transmittance and high polarization characteristics. However, even with such dye-based polarization plates that offer a wide selection of colors, the polarization elements to date have been ones that, when it is attempted to arrange polarization elements parallel to the absorption axis to produce white, instead emit a yellowish tinge. When, in order to ameliorate the yellowish tinge encountered with the parallel arrangement, a polarization plate designed to minimize the yellowish tinge encountered with the parallel arrangement is fabricated, a resultant problem is that, when the polarization element is arranged on an orthogonal axis with respect to the absorption axis, black appears as blue. Therefore, while there is a need, as a polarization element, for a polarization plate that expresses achromatic white when white color is to be displayed, and that expresses achromatic black when black color is to be displayed, no polarization element or polarization plate has been capable of expressing achromatic white when displaying white, and achromatic black when displaying black, at single transmittance of 35% or above.

PRIOR ART REFERENCES

Patent References

Patent Reference 1: Japanese Patent No. 4281261 Patent Reference 2: Japanese Patent No. 3357803

Non-Patent References

Non-Patent Reference 1: Kinosei Shikiso no Oyo (Application of functional dye), First Edition, CMC Shuppan Co., Ltd., M. Irie, ed., p. 98-100
Non-Patent Reference 2: Senryo Kagaku (Chemistry of Dyes), Yutaka Hosoda, Gihodo Shuppan

SUMMARY OF THE INVENTION

Problems to be Solved by the Invention

Techniques such as those of Patent Reference 1 or Patent Reference 2 have been disclosed by way of methods for improving the hue of polarization plates. In Patent Reference 1, there is disclosed a polarization plate for which a neutral coefficient is calculated, the absolute value being from 0 to 3; however, from the working examples it is understood that, notwithstanding the low neutral coefficient (Np), for the parallel hue calculated from JIS Z 8729, the a* value is from −2 to −1, and the b* value is from 2.5 to 4.0, and therefore when white is to be expressed, the color appears as a greenish yellow color. For the orthogonal hue, the a* value is from 0 to 1, and the b* value is from −1.5 to −4.0, and therefore the polarization plate presents a blue color. In Patent Reference 2, there is disclosed a polarization element, the average value of transmittance at 410 nm to 750 nm of which is adjusted to no more than ±30% by adding, in addition to iodine, a direct dye, reactive dye, or acid dye; however, the polarization element obtained thereby has single transmittance, that is, the polarization element has the color when measured using only a single polarization element, such that the a value and the b value in the UCS color space have absolute values no more than 2. Thus, the element is not able to simultaneously express as achromatic color the hues produced during white display (when parallel) and black display (when orthogonal), with use of two polarization plates. As may be seen from the working examples, the single transmittance in Working Example 1 is 31.95%, and that in Working Example 2 is 31.41%; due to this low transmittance, the element does not have satisfactory performance, in terms of higher transmittance and higher degree of polarization, in fields where high transmittance and high contrast are required, particularly liquid crystal display devices, organic electroluminescence, and similar fields. In particular, no highly transmissive polarization plate, specifically, having a single transmittance of 40% or higher, has been obtained, particularly in that achromatic polarization plates have been more difficult to obtain for higher levels of transmittance. There is a demand for polarization plates that have higher transmittance and that display achromatic white when in a parallel arrangement and achromatic black when in an orthogonal arrangement. Furthermore, since iodine is also used as a principal dichromatic pigment in Example 1 and Example 2, the polarization elements or polarization plates exhibited considerable color change subsequent to durability testing, in particular subsequent to testing of durability against heat and humidity, thus the polarizing element and polarization plates lacked durability.

Means Used to Solve the Above-Mentioned Problems

As a result of extensive study directed to solving the aforedescribed problem, the inventors made the novel discovery that a polarization element which has a single transmittance of 35% to 60%, and comprises a base material containing a dichroic dye comprising an azo compound, the polarization element being characterized in that the a* value and the b* value of a hue calculated in accordance with JIS-Z-8729 are such that the absolute values of the a* value and the b* value when the single transmittance is measured are no more than 1, the absolute values of the a* value and the b* value measured with two of the base materials being arranged in parallel with respect to the direction of the absorption axis are no more than 2, and the absolute values of the a* value and the b* value measured with two of the base materials being arranged orthogonally with respect to the direction of the absorption axis are no more than 2, affords a polarization element or polarization plate that, while having high transmittance, has a high polarization degree and high durability, and is capable of expressing achromatic white when the absorption axis of the polarization element is arranged in parallel, and capable of expressing achromatic black when the absorption axis of the polarization element is arranged orthogonally.

Specifically, the present invention relates to:

"(1) A polarization element comprising a base material containing an azo compound, wherein the polarization element is characterized in that:

a* value and b* value of a hue calculated in accordance with JIS-Z-8729 are such that absolute values of the a* value and the b* value when the single transmittance is measured are no more than 1, absolute values of the a* value and the b* value measured with two of the base materials being arranged in parallel with respect to an absorption axis direction are no more than 2, and absolute values of the a* value and the b* value measured with two of the base materials being arranged orthogonally with respect to the absorption axis direction are no more than 2; and the single transmittance is 35-60%.

(2) The polarization element as in (1), characterized in that: transmittance of individual wavelengths during irradiation with polarized light, an absolutely polarized form of which having a vibration direction orthogonal to a absorption axis direction of the base material polarization element, is such that an absolute value of difference between average transmittance at 550 nm to 600 nm and average transmittance at 400 nm to 460 nm is no more than 2%, and an absolute value of difference between average transmittance at 600 nm to 670 nm and average transmittance at 550 nm to 600 nm is no more than 2%.

(3) The polarization element as in (1) or (2), characterized in that the base material containing an azo compound contains, in a form of a free acid, azo compounds, wherein the azo compounds are an azo compound represented by formula (1) or a salt thereof, and azo compounds represented by formula (2) or a salt thereof:

[Chemical formula 1]

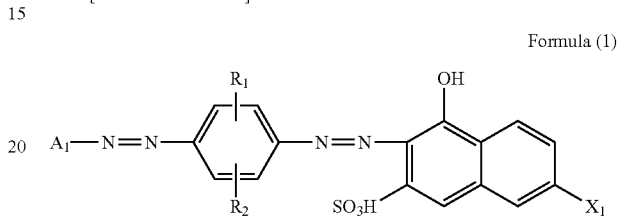

Formula (1)

(wherein $A_1$ represents a phenyl group or naphthyl group having a substituent group; $R_1$ and $R_2$ each independently represent a hydrogen atom, a lower alkyl group, a lower alkoxy group, a sulfo group, or a lower alkoxy group having a sulfo group; and $X_1$ represents a phenylamino group optionally having a substituent group.)

[Chemical formula 2]

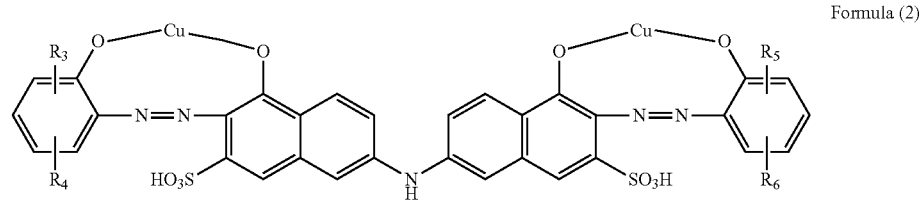

Formula (2)

transmittance at 550 nm to 600 nm and average transmittance at 400 nm to 460 nm is no more than 4%, and an absolute value of difference between average transmittance at 600 nm to 670 nm and average transmittance at 550 nm to 600 nm is no more than 3%; and transmittance of individual wavelengths during irradiation with polarized light, an absolutely polarized form of which having a vibration direction parallel to the absorption axis direction of a base material polarization element, is such that an absolute value of difference between average transmittance at 550 nm (wherein each of $R_3$ to $R_6$ independently represents a hydrogen atom, a lower alkyl group, a lower alkoxy group, a sulfo group, a lower alkoxy group having a sulfo group, a carbonyl group, or a halogen atom.)

(4) The polarization element according to (1) or (2), characterized in that the base material containing the azo compound contains, in the form of a free acid, an azo compound represented by formula (1) or a salt thereof, and an azo compound represented by formula (3) or a salt thereof.

[Chemical formula 3]

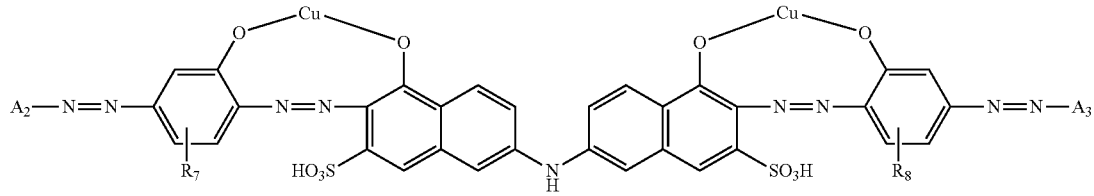

Formula (3)

(wherein $A_2$ and $A_3$ each independently represents a naphthyl group or phenyl group of which at least one substituent group is a sulfo group, lower alkyl group, lower alkoxy group, lower alkoxy group having a sulfo group, carboxy group, nitro group, amino group, or substituted amino group; and each of $R_7$ and $R_8$ independently represents a hydrogen atom, a lower alkyl group, a lower alkoxy group, or a lower alkoxy group having a sulfo group.)

(5) The polarization element according to any of (1) to (4), characterized by containing, in the form of a free acid, an azo compound selected from azo compounds represented by formula (4), salts thereof, and transition metal complexes thereof:

[Chemical formula 4]

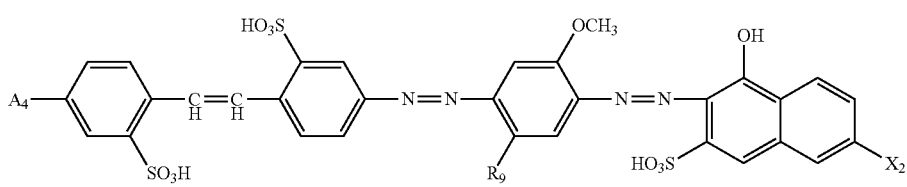

Formula (4)

(wherein $A_4$ represents a nitro group or an amino group; $R_9$ represents a hydrogen atom, a hydroxyl group, a lower alkyl group, a lower alkoxy group, a sulfo group, or a lower alkoxy group having a sulfo group; and $X_2$ represents a phenylamino group optionally having a substituent group.)

(6) The polarization element according to any of (1) to (5), characterized by containing, in the form of a free acid, an azo compound represented by formula (5), and an azo compound selected from salts or transition metal complexes of an azo compound represented by formula (5):

[Chemical formula 5]

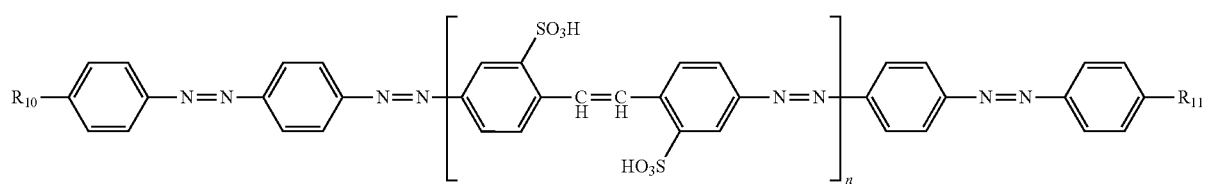

Formula (5)

(wherein $R_{10}$ and $R_{11}$ each independently represents a sulfo group, a carboxy group, a hydroxy group, a lower alkyl group, or a lower alkoxyl group; and n represents an integer from 1 to 3.).

(7) The polarization element according to any of (3) to (6), characterized in that $A_1$ in formula (1) is a phenyl group having a substituent group.

(8) The polarization element according to any of (3) to (7), characterized in that the azo compound represented by formula (4) is a copper complex.

(9) The polarization element according to any of (3) to (8), characterized in that the $A_4$ substituent group in formula (4) is a nitro group.

(10) The polarization element according to any of (3) to (9), characterized in that $A_2$ and $A_3$ in formula (3) are naphthyl groups having sulfo groups.

(11) The polarization element according to any of (3) to (10), characterized by containing all of the azo compounds represented by formula (1), formula (2), and formula (3).

(12) The polarization element according to any of (1) to (11), characterized in that the base material is formed from a polyvinyl alcohol resin film.

(13) The polarization element according to any of (1) to (12), characterized by having a single transmittance of 35-60%, and a polarization degree equal to or greater than a value obtained using numerical formula (I):

[Numerical formula 1]

$$\rho y = -0.0906 \times Ys^2 + 5.97 \times Ys \qquad \text{Numerical formula (I)}$$

(wherein Ys represents the single transmittance, and $\rho y$ represents the degree of polarization.).

(14) The polarization plate according to any of (1) to (13), comprising a support film furnished to at least one surface of the polarization element.

(15) A liquid crystal display device comprising the polarization element or polarization plate according to any of (1) to (14) is used."

Effect of the Invention

The polarization element of the present invention allows a polarization element or polarization plate to be obtained that, while having high transmittance, has a high polarization degree and high durability, and is capable of expressing achromatic white when the absorption axis of the polarization element is arranged in parallel, and capable of expressing achromatic black when the absorption axis of the polarization element is arranged orthogonally.

BRIEF DESCRIPTION OF THE DRAWINGS

FIG. 1 shows an example of the intensity of reflected light at individual wavelengths in an electrode of a reflection liquid crystal.

BEST MODE FOR CARRYING OUT THE INVENTION

The polarization element of the present invention, in one aspect thereof, comprises a base material containing a dichroic dye formed from an azo compound, wherein the polarization element is characterized in that the a* value and the b* value of a hue calculated in accordance with JIS-Z-8729 are such that the absolute values of the a* value and the b* value when the single transmittance is measured are no more than 1, the absolute values of the a* value and the b* value measured with two of the base materials being arranged in parallel with respect to the direction of the absorption axis are no more than 2, and the absolute values of the a* value and the b* value measured with two of the base materials being arranged orthogonally with respect to the direction of the absorption axis are no more than 2; and the single transmittance is 35-60%. The object color display method specified in JIS Z 8729 is equivalent to the object color display method specified by the International Commission on Illumination (abbreviated CIE). Single-body transmittance indicates the transmittance observed when transmittance is measured from one (a single) polarization element while natural light is directed thereon; it is necessary that the hue observed during measurement of single transmittance be such that the a* value (hereinafter denoted as a*–s) and the b* value (hereinafter denoted as b*–s), expressed as absolute values, are no more than 1. Moreover, a polarization plate that can express achromatic color can be realized where, with natural light being incident thereon, the absolute values of the a* value (hereinafter denoted as a*–p) and the b* value (hereinafter denoted as b*–p) measured with two base materials being arranged in parallel with respect to the direction of the absorption axis are no more than 2, and where, with natural light being incident thereon, the absolute values of the a* value (hereinafter denoted as a*–c) and the b* value (hereinafter denoted as a*–c) measured with two base materials being arranged orthogonally with respect to the direction of the absorption axis are no more than 2. In preferred practice, the absolute values of a*–p and b*–p are no more than 1.5, and the absolute values of a*–c and b*–c are no more than 1.5; and more preferably the absolute values of a*–p and b*–p are no more than 1.0, and the absolute values of a*–c and b*–c are no more than 1.0. Humans can perceive a difference in color as small as an absolute value of 0.5 between the absolute values of a*–p and b*–p, and it is therefore extremely important to control the numerical values. In particular, where the absolute values of a*–p and b*–p are no more than 1, the polarization plate will be good enough that it is substantially impossible to distinguish the appearance of color, when the color is substantially white, or when black.

While high transmittance and a high degree of polarization are required as capabilities of a polarization plate, provided that the single transmittance of the plate is 35-60%, ample brightness can be expressed even when employed in a display device; a level of 38-55% is preferred, with 40-55% being more preferred. It is possible to display achromatic white when in a parallel arrangement, and achromatic black when in an orthogonal arrangement, even if the single transmittance is equal to or greater than 60%; however, because the degree of polarization is severely reduced, this is undesirable.

It is possible, by compounding the base material with a dichroic dye formed from an azo compound, to realize a polarization element in which the a* value and the b* value of a hue calculated in accordance with JIS-Z-8729 are such that the absolute values of the a* value and the b* value when the single transmittance is measured are no more than 1, the absolute values of the a* value and the b* value measured with two of the base materials being arranged in parallel with respect to the direction of the absorption axis are no more than 2, and the absolute values of the a* value and the b* value measured with two of the base materials being arranged orthogonally with respect to the direction of the absorption axis are no more than 2; and the single transmittance is 35% or more.

The base material is obtained by forming a film using an azo compound, particularly a material formed from a hydrophilic polymer that typically can contain a dichroic dye. Examples of the hydrophilic polymer include, but not limited to, polyvinyl alcohol resins, amylose resins, starch based resins, cellulose resins, polyacrylate resins, and the like. When a dichroic pigment is to be contained, polyvinyl alcohol resins and resins comprising derivatives thereof are most desirable due to properties such as processability, dye affinity, crosslinkability, and the like. A polarization element or polarization plate can be fabricated by forming the resins into a film, compounding the film with a dye of the present invention and a blend thereof, and applying an orientation process such as stretching.

As dichroic dyes comprising azo compounds, organic compounds such as those indicated, e.g., in Non-Patent Reference 1, can be used. In particular, highly dichroic dyes are especially preferred. Examples of such compounds include C.I. Direct Yellow-12, C.I. Direct Yellow-28, C.I. Direct Yellow-44, C.I. Direct Orange 26, C.I. Direct Orange 39, C.I. Direct Orange 107, C.I. Direct Red 2, C.I. Direct Red 31, C.I. Direct Red 79, C.I. Direct Red 81, C.I. Direct Red 247, C.I. Direct Green 80, C.I. Direct Green 59, and the organic dyes disclosed in Japanese Laid-Open Patent Application 2001-33627, Japanese Laid-Open Patent Application 2002-296417, and Japanese Laid-Open Patent Application 60-156759. These organic dyes can be used in the form of free acids, or of alkali metal salts (e.g., Na, K, or Li salts), ammonium salts, or amine salts. However, the dichroic dyes are not limited to these, and any of the known dichroic dyes can be employed. The optical characteristics are particularly improved where the azo compound is a free acid, salt thereof, or copper complex salt dye thereof. It is acceptable to employ a single type of azo compound, or to employ blends with other azo compounds, with no limitation as to the blend. By employing such an azo compound, and adjusting the transmittance of the polarization element, it is possible to provide a polarization element characterized in that the a* value and the b* value of a hue calculated in accordance with JIS-Z-8729 are such that the absolute values of the a* value and the b* value when the single transmittance is measured are no more than 1, the absolute values of the a* value and the b* value measured with two of the base materials being arranged in parallel with respect to the direction of the absorption axis are no more than 2, and the absolute values of the a* value and the b* value measured with two of the base materials being arranged orthogonally with respect to the direction of the absorption axis are no more than 2; and the single transmittance is 35-60%.

The polarization element can be readily realized by controlling the transmittance thereof at individual wavelengths, the polarization element being characterized in that the a* value and the b* value of a hue calculated in accordance with JIS-Z-8729 are such that the absolute values of the a* value and the b* value when the single transmittance is measured are no more than 1, the absolute values of the a* value and the b* value measured with two of the base materials being arranged in parallel with respect to the direction of the absorption axis are no more than 2, and the absolute values of the a* value and the b* value measured with two of the base materials being arranged orthogonally with respect to the direction of the absorption axis are no more than 2; and the single transmittance is 35-60%. One control method by which such an element is readily realized involves controlling the transmittance of individual wavelengths during irradiation with polarized light, the substantially 100% polarized ("absolutely polarized") form of which having a vibration direction orthogonal to the absorption axis direction of the base material (polarization element), such that the absolute value of the difference between the average transmittance at 550 nm to 600 nm and at 400 nm to 460 nm is controlled to no more than 4%, and the absolute value of the difference between the average transmittance at 600 nm to 670 nm and the average transmittance at 550 nm to 600 nm is controlled to no more than 3%; and the transmittance of individual wavelengths during irradiation with polarized light, the absolutely polarized form of which having a vibration direction parallel to the absorption axis direction of the base material polarization element, is such that the absolute value of the difference between the average transmittance at 550 nm to 600 nm and the average transmittance at 400 nm to 460 nm is adjusted to no more than 2%, and the absolute value of the difference between the average transmittance at 600 nm to 670 nm and the average transmittance at 550 nm to 600 nm is adjusted to no more than 2%. It is preferable to control the transmittance of individual wavelengths during irradiation with polarized light, the absolutely polarized form of which having a vibration direction being orthogonal, such that the absolute value of the difference between the average transmittance at 550 nm to 600 nm and at 400 nm to 460 nm is no more than 2.0%, and the absolute value of the difference between the average transmittance at 600 nm to 670 nm and the average transmittance at 550 nm to 600 nm is no more than 2.0%; and, further to adjust the transmittance of individual wavelengths during irradiation with polarized light, the absolutely polarized form of which having a vibration direction parallel to the absorption axis direction of the base material polarization element, such that the absolute value of the difference between the average transmittance at 550 nm to 600 nm and at 400 nm to 460 nm is no more than 2.0%, and the absolute value of the difference between the average transmittance at 600 nm to 670 nm and the average transmittance at 550 nm to 600 nm is no more than 2.0%. It is even more preferable to control the transmittance of individual wavelengths during irradiation with polarized light, the absolutely polarized form of which having a vibration direction being orthogonal, such that the absolute value of the difference between the average transmittance at 550 nm to 600 nm and the average transmittance at 400 nm to 460 nm is no more than 1.5%, and the absolute value of the difference between the average transmittance at 600 nm to 670 nm and the average transmittance at 550 nm to 600 nm is no more than 1.5%; and, further, to adjust the transmittance of individual wavelengths during irradiation with polarized light, the absolutely polarized form of which having a vibration direction parallel to the absorption axis direction of the base material polarization element, such that the absolute value of the difference between the average transmittance at 550 nm to 600 nm and at 400 nm to 460 nm is no more than 1.5%, and the absolute value of the difference between the average transmittance at 600 nm to 670 nm and the average transmittance at 550 nm to 600 nm is no more than 1.5%.

In regard to pigments that are useful in making it possible to perform a control for individual wavelengths such that, with a polarizing element in which the single transmittance is 35-60%, as regards the a* value and the b* value calculated in accordance with JIS-Z-8729, the absolute values of the a* value and the b* value when the single transmittance is measured are no more than 1, the absolute values of the a* value and the b* value measured with two of the base materials being arranged in parallel with respect to the direction of the absorption axis are no more than 2, and the absolute values of the a* value and the b* value measured with two of the base materials being arranged orthogonally with respect to the direction of the absorption axis are no more than 2, the base material is colored by being compounded, as an azo compound and in the form of a free acid, with an azo compound represented by formula (1) or a salt thereof, and additionally an azo compound represented by formula (2) or a salt thereof, whereby it is possible to excellent display achromatic white in a parallel arrangement and achromatic black in an orthogonal arrangement. Alternatively, the base material is colored by being compounded, as an azo compound and in the form of a free acid, with an azo compound represented by formula (1) or a salt thereof, and additionally an azo compound represented by formula (3) or a salt thereof, whereby it is possible to better display achromatic white in a parallel arrangement and achromatic black in an orthogonal arrangement. Furthermore, causing the base material to contain an azo dye selected from an azo compound represented by formula (4), a salt thereof, or a metal complex thereof makes it possible not only to improve the achromaticity of the hue in a parallel arrangement and in an orthogonal arrangement, but also to realize a polarization plate having high transmittance and a high polarization degree. There is no particular limitation as to the metal complex, but a copper complex is particularly preferred. Furthermore, the base material may be compounded with an azo compound represented by formula (5) or a salt thereof in order to further raise the transmittance and the polarization degree and further improve the achromaticity of the hue when in a parallel arrangement and when in an orthogonal arrangement. Using the pigment of formula (4) or formula (5) allows a highly durable achromatic polarization plate to be obtained, the polarization plate not exhibiting color change even after durability testing. Furthermore, in order to produce a polarization element that better displays achromatic white in a parallel arrangement and achromatic black in an orthogonal arrangement, the polarization element is made to simultaneously contain the pigments represented by formula (1), formula (2), and formula (3), whereby a polarization element is obtained that displays achromatic white when in a parallel arrangement and achromatic black when in an orthogonal arrangement while having higher transmittance, and that has a high degree of polarization.

[Chemical formula 6]

Formula (1)

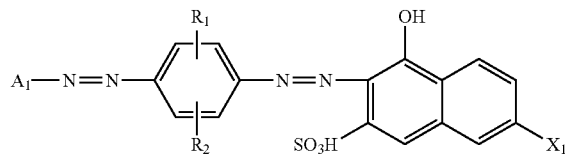

(wherein A1 represents a phenyl group or naphthyl group having a substituent group; R1 and R2 each independently represent a hydrogen atom, a lower alkyl group, a lower alkoxy group, a sulfo group, or a lower alkoxy group having a sulfo group; and X1 represents a phenylamino group optionally having a substituent group.)

[Chemical formula 7]

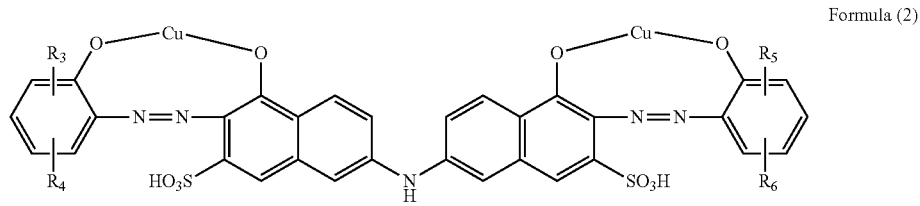
Formula (2)

(wherein $R_3$ to $R_6$ each independently represent a hydrogen atom, a lower alkyl group, a lower alkoxy group, a sulfo group, a lower alkoxy group having a sulfo group, a carbonyl group, or a halogen atom.)

[Chemical formula 8]

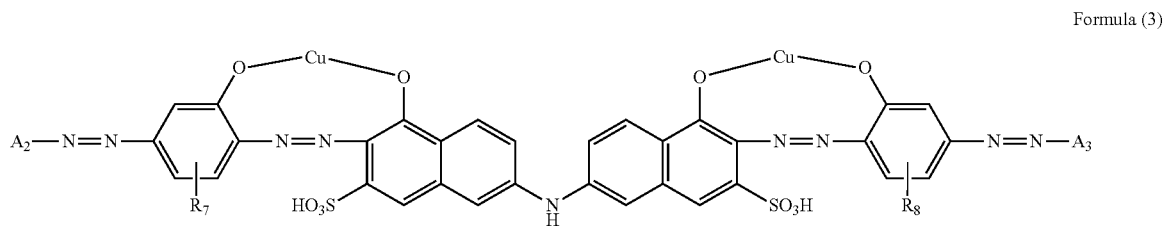
Formula (3)

(wherein $A_2$ and $A_3$ each independently represent a naphthyl group or phenyl group of which at least one substituent group is a sulfo group, lower alkyl group, lower alkoxy group, lower alkoxy group having a sulfo group, carboxy group, nitro group, amino group, or substituted amino group; and each of $R_7$ and $R_8$ independently represents a hydrogen atom, a lower alkyl group, a lower alkoxy group, or a lower alkoxy group having a sulfo group.)

[Chemical formula 9]

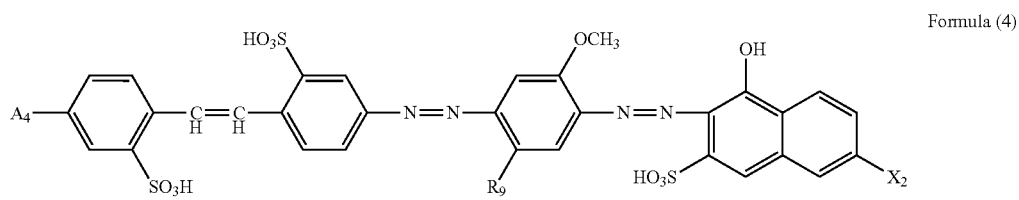
Formula (4)

(wherein $A_4$ represents a nitro group or an amino group; $R_9$ represents a hydrogen atom, a hydroxyl group, a lower alkyl group, a lower alkoxy group, a sulfo group, or a lower alkoxy group having a sulfo group; and $X_2$ represents a phenylamino group optionally having a substituent group.)

[Chemical formula 10]

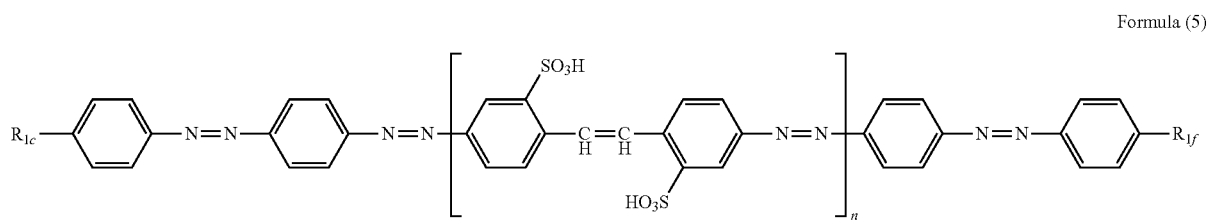
Formula (5)

(wherein $R_{10}$ and $R_{11}$ each independently represent a sulfo group, a carboxy group, a hydroxy group, a lower alkyl group, or a lower alkoxyl group; and n represents an integer from 1 to 3.)

The pigment represented by formula (1) can be produced by the methods disclosed in Japanese Laid-Open Patent Application 2003-215338, Japanese Laid-Open Patent Application 9-302250, Japanese Patent Publication 3881175, Japanese Patent Publication 4452237, Japanese Patent Publication 4662853, and the like; however, there is no limitation thereto.

The azo compound represented by formula (2) or salt thereof can easily be prepared by performing coupling according to a common method for manufacturing an azo dye such as is described in non-patent document 2. A specific manufacturing method comprises, e.g., diazotizing an amino compound represented by formula (6) using a well-known method and performing alkali coupling with N,N-bis(1-hydroxy-3-sulfo-6-naphthyl)amine (common name: di-J acid) at 10-20° C. to obtain a disazo compound. The resulting disazo compound, with copper sulfate, ammonia water, amino alcohol, and hexamethylenetetramine added thereto, is subjected to a copperization reaction with, e.g., copper sulfate at 85-95° C. to obtain a solution containing the compound of formula (2). This solution is subsequently evaporated to dryness, or salted out and over-dried, and then pulverized to form a powder, whereby the compound of formula (2) can be obtained.

[Chemical formula 1]

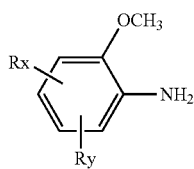

Formula (6) (*1)

(wherein Rx and Ry have the same meaning as $R_3$ to $R_6$ in formula (2))

The pigment represented by formula (3) can be obtained using the methods described in, e.g., WO 2012/165223 A1; however, the production method is not limited thereto. The pigment represented by formula (4) can be obtained using the methods described in, e.g., Japanese Patent Application No. 2011-197600; however, the production method is not limited thereto. The pigment represented by formula (5) can be obtained using the methods described in, e.g., WO 2007/138980; however, the production method is not limited thereto.

In order to obtain polarization elements having higher transmittance and a higher polarization degree, and expressing more achromatic parallel and orthogonal hues, $A_1$ of formula (1) should be a phenyl group having a substituent. In this case, preferred substituents are a sulfo group, a carbonyl group, a hydroxyl group, a lower alkyl group, a lower alkoxy group, an alkoxyl group having a sulfo group, or a lower alkoxy group having a sulfo group; more preferred are a sulfo group or a carbonyl group. A single such substituent group is acceptable, as are two or more multiple substituent groups. In the lower alkyl groups and lower alkoxy groups of the present invention, "lower" refers to a carbon number of 1 to 3.

Furthermore, in order to obtain polarization elements having higher transmittance and a higher polarization degree, and expressing more achromatic parallel and orthogonal hues, it is preferable for the substituent group of $A_4$ in formula (3) to be a nitro group because polarization performance is improved thereby. Furthermore, in order to obtain polarization elements having higher transmittance and a higher polarization degree, and expressing more achromatic parallel and orthogonal hues, it is preferable for the substituent group of $R_9$ to be a methoxy group.

Furthermore, in order to obtain polarization elements having higher transmittance and a higher polarization degree, and expressing more achromatic parallel and orthogonal hues, it is preferable for $A_2$ and $A_3$ in formula (3) to be sulfo groups, or naphthyl groups having a carbonyl group. It is particularly preferable for $A_2$ and $A_3$ in formula (3) to be sulfo groups because this allows a polarization plate having high contrast to be obtained.

Furthermore, in order to obtain polarization elements having higher transmittance and a higher polarization degree, and expressing more achromatic parallel and orthogonal hues, it is preferable for $R_{10}$ and $R_{11}$ in formula (5) to be sulfo groups or carbonyl groups so as to obtain polarization plates that are achromatic during black display and white display. It is preferable to modify the terminals in formula (5) because the polarization degree at the short-wavelength side of the polarization element, and particularly the degree of polarization at 400 nm to 480 nm, is improved, whereby the b*–p or b*–c value of the polarization plate approaches zero, i.e., more closely approaches achromaticity.

Furthermore, in order to obtain polarization elements having higher transmittance and a high degree of polarization, and expressing more achromatic parallel and orthogonal hues, it is particularly preferable for the polarization element to contain all of the azo compounds represented by formula (1), formula (2), and formula (3).

Specific examples of the pigment represented by formula (1) may include the dyes disclosed in Japanese Patent Publication 3881175, Japanese Patent Publication 4033443, and the like. More specific examples of azo compounds represented by formula (1) are given below, in the form of a free acid.

Compound Example 1

[Chemical formula 12]

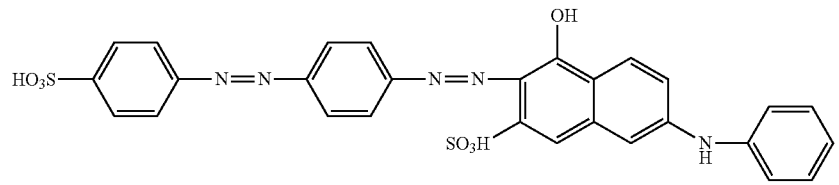

Compound Example 2
[Chemical formula 13]
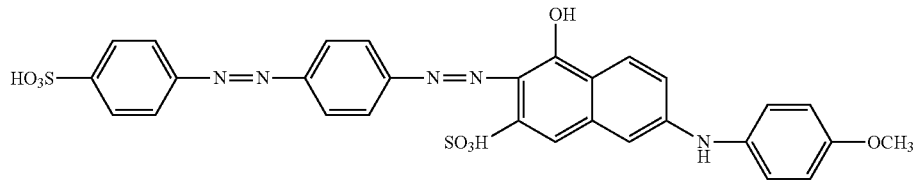
Compound Example 3
[Chemical formula 14]
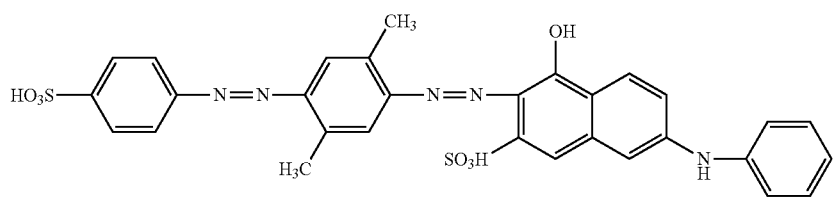
Compound Example 4
[Chemical formula 15]
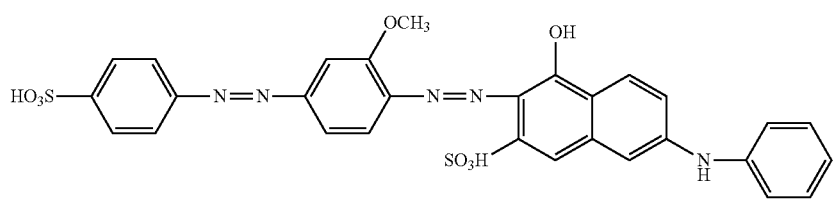
Compound Example 5
[Chemical formula 16]
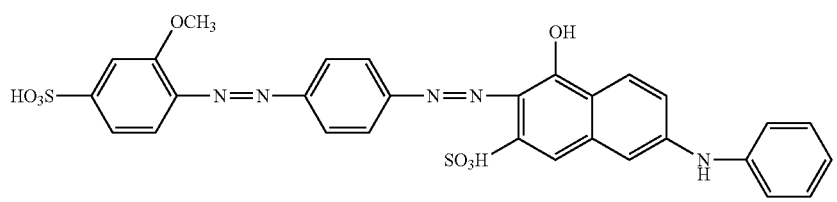
Compound Example 6
[Chemical formula 17]
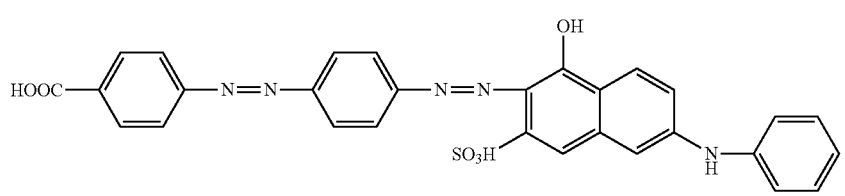

Compound Example 7
[Chemical formula 18]
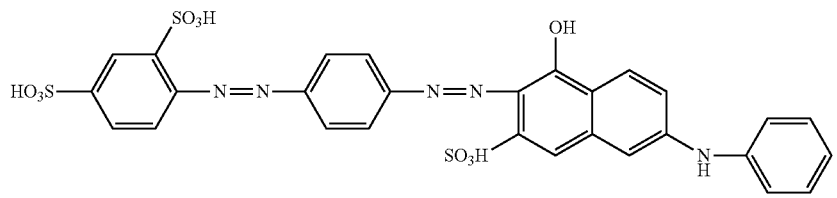
Compound Example 8
[Chemical formula 19]
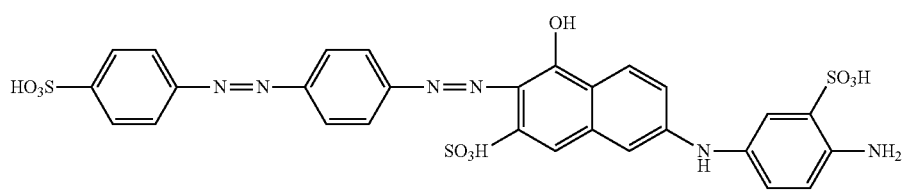
Compound Example 9
[Chemical formula 20]
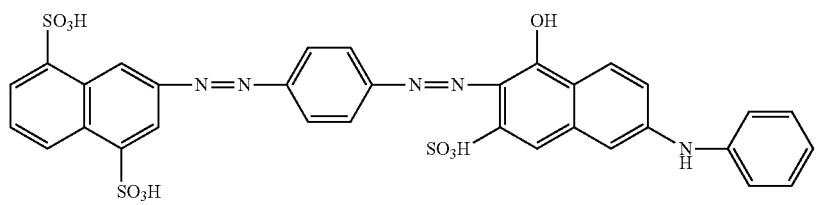
Compound Example 10
[Chemical formula 21]
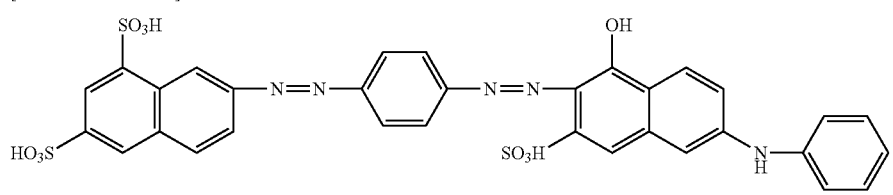
Next, specific examples of azo compounds represented by formula (2) are given below, in the form of a free acid.
Compound Example 11
[Chemical formula 22]
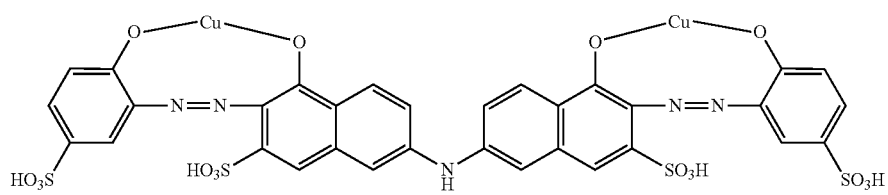

Compound Example 12
[Chemical formula 23]
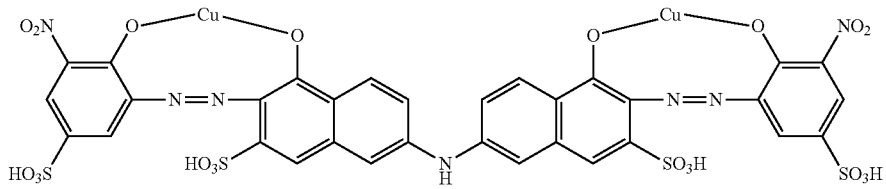
Compound Example 13
[Chemical formula 24]
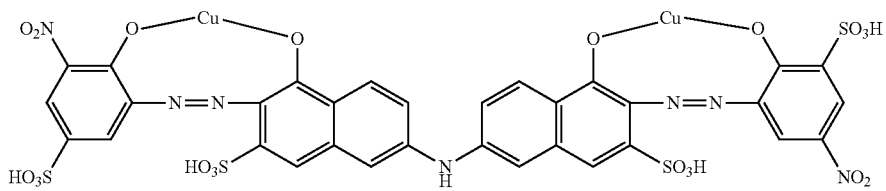
Compound Example 14
[Chemical formula 25]
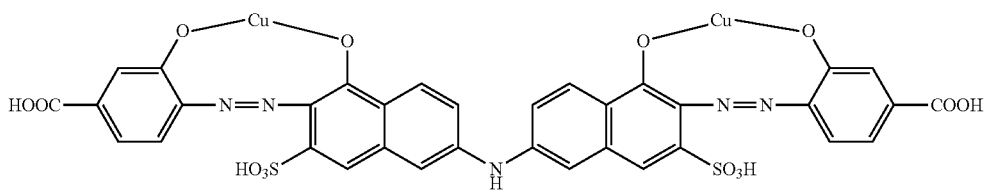
Compound Example 15
[Chemical formula 26]
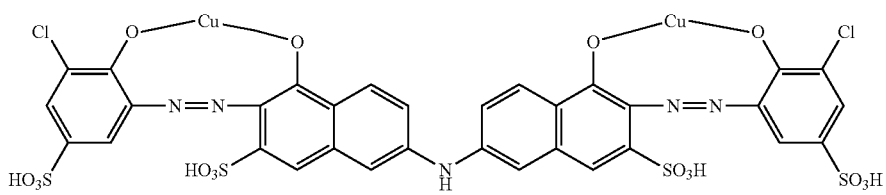
Compound Example 16
[Chemical formula 27]
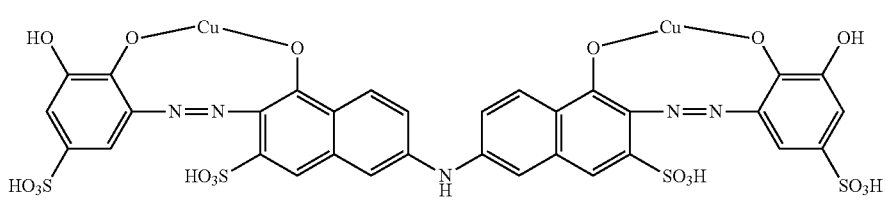

Compound Example 17
[Chemical formula 28]
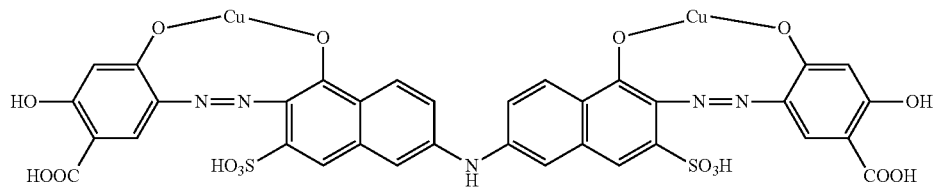
Next, specific examples of azo compounds represented by formula (3) are given below, in the form of a free acid.
Compound Example 18
[Chemical formula 29]
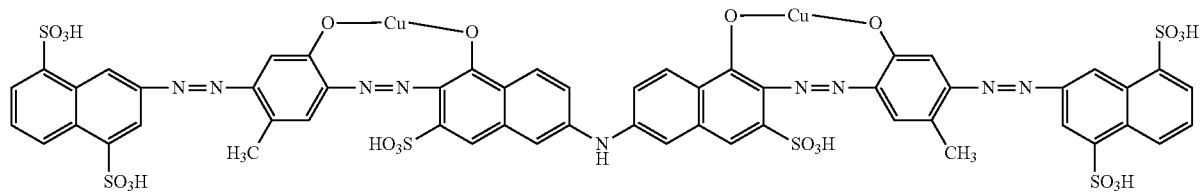
Compound Example 19
[Chemical formula 30]
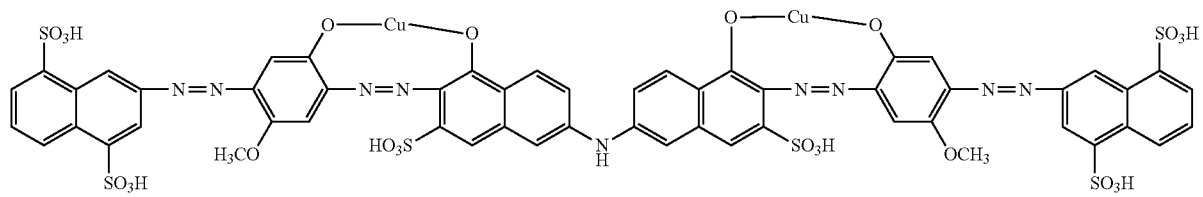
Compound Example 20
[Chemical formula 31]
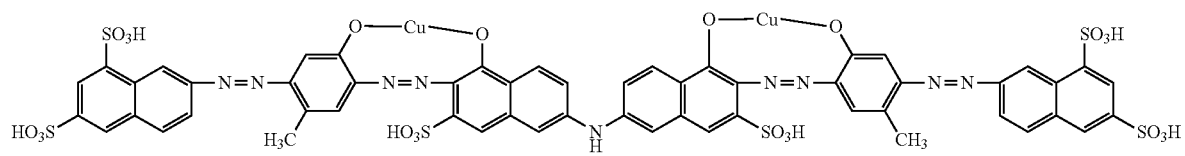
Compound Example 21
[Chemical formula 32]
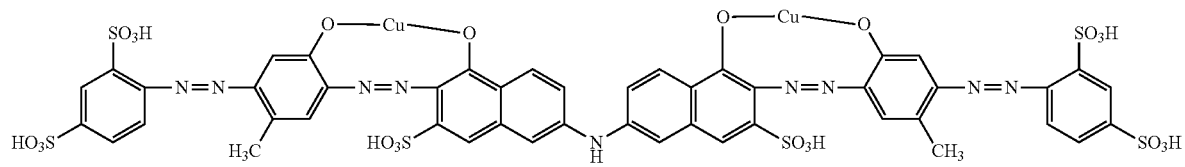

Compound Example 22
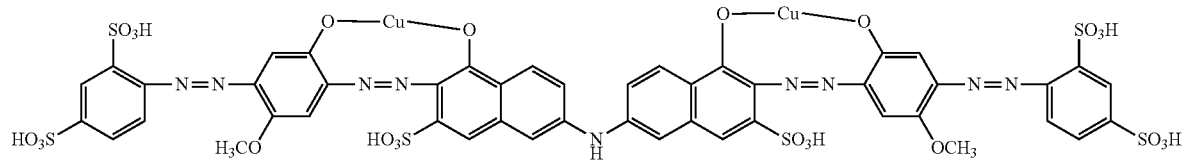
Next, specific examples of azo compounds represented by formula (4) are given below, in the form of a free acid.
Compound Example 23
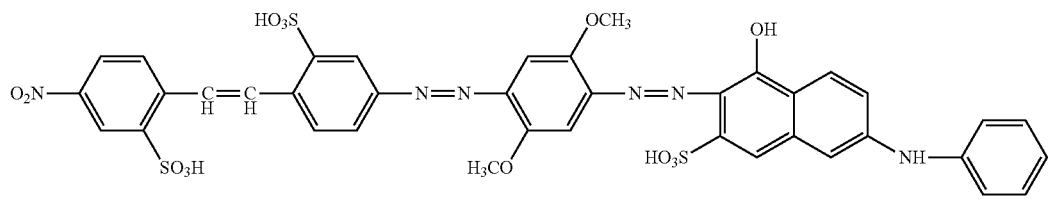
Compound Example 24
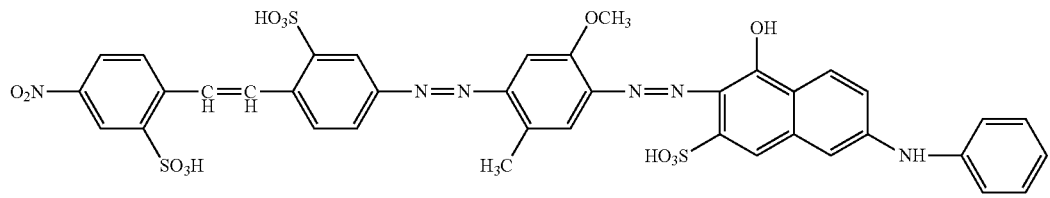
Compound Example 25
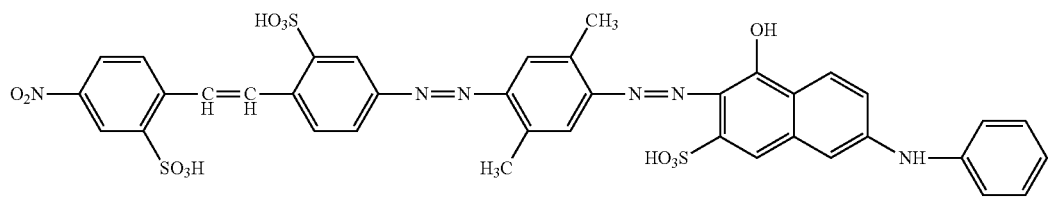
Compound Example 26
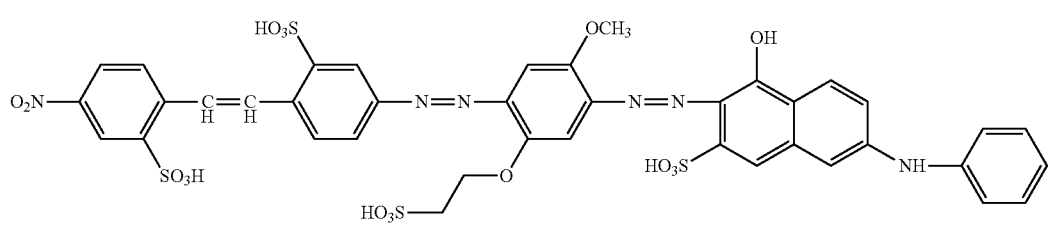

Compound Example 27
[Chemical formula 38]
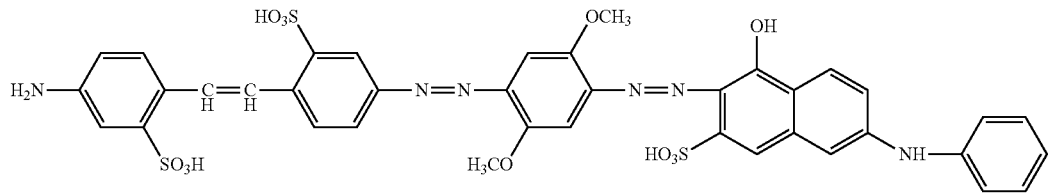
Compound Example 28
[Chemical formula 39]
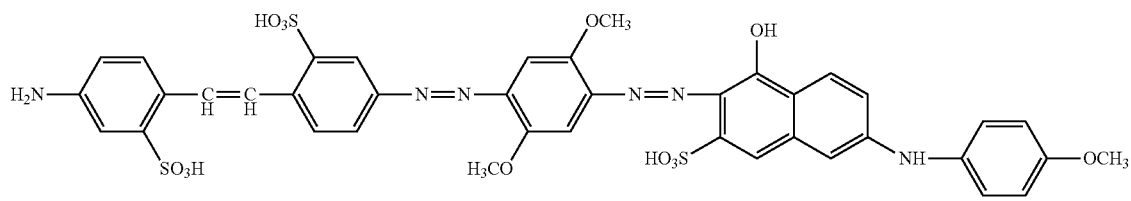
Compound Example 29
[Chemical formula 40]
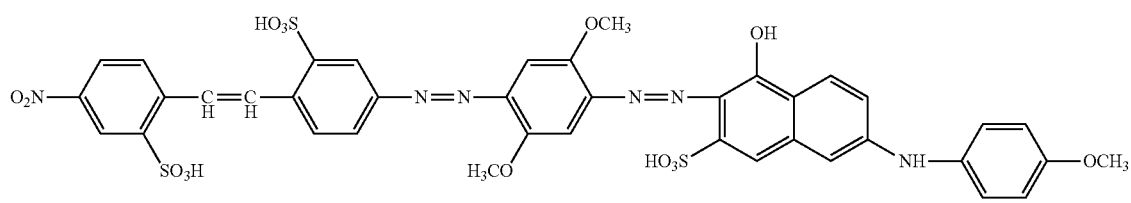
Compound Example 30
[Chemical formula 41]
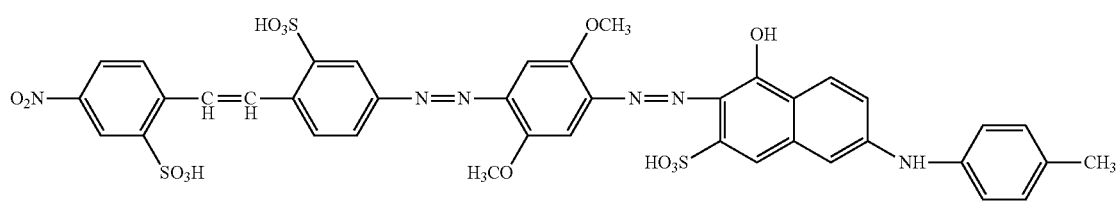
Compound Example 31
[Chemical formula 42]
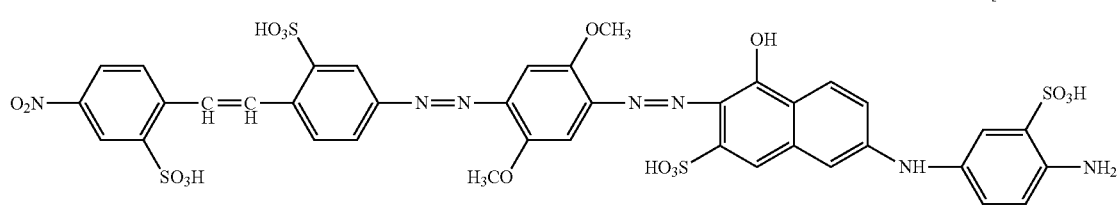

Compound Example 32

[Chemical formula 43]

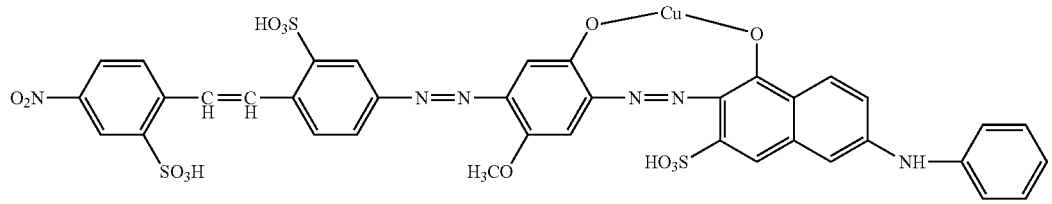

Compound Example 33

[Chemical formula 44]

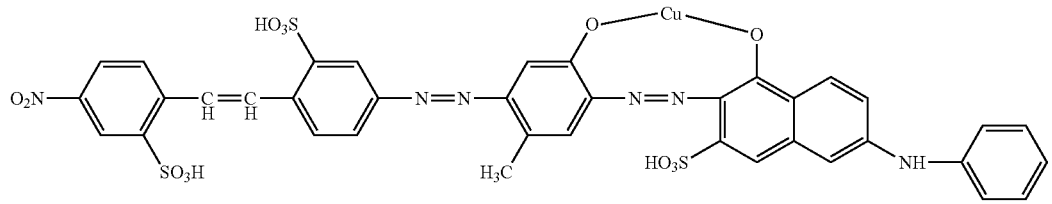

Compound Example 34

[Chemical formula 45]

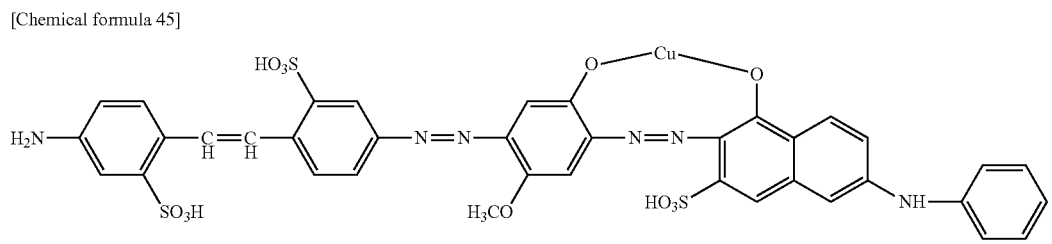

Compound Example 35

[Chemical formula 46]

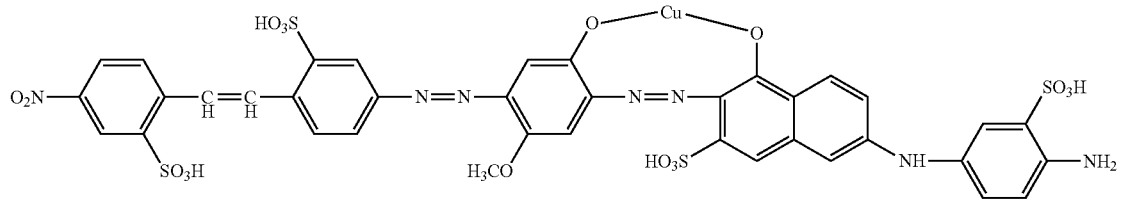

Next, examples of acceptable azo compounds represented by formula (5) include, but are not limited to, C.I. Direct Yellow 4, C.I. Direct Yellow 12, C.I. Direct Yellow 72, C.I. Direct Orange 39, the dyes disclosed in WO 2007/138980, and other such azo compounds having a stilbene structure. Specific examples of azo compounds represented by formula (5) for use in the present invention are given below. The compound examples are represented in the form of a free acid.

Compound Example 36

[Chemical formula 47]

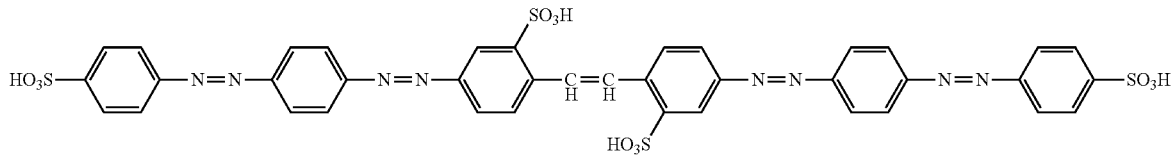

Compound Example 37

[Chemical formula 48]

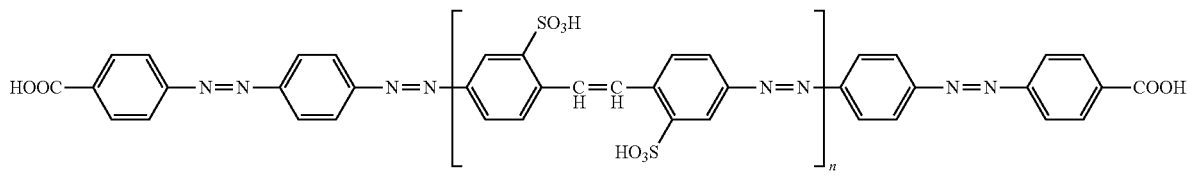

(wherein n represents an integer of 1 or 2.)

Compound Example 38

[Chemical formula 49]

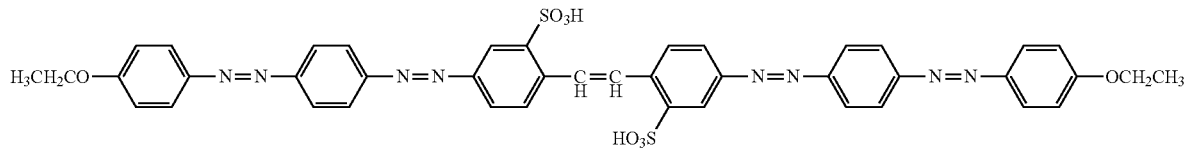

Compound Example 39

[Chemical formula 50]

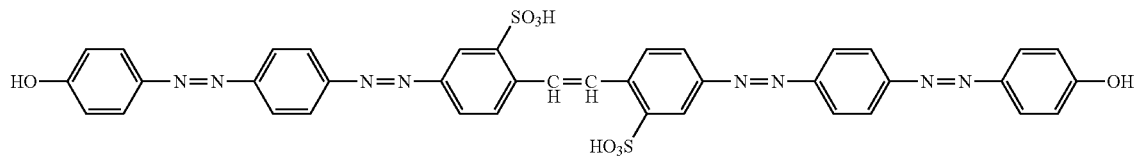

A specific example of a polarization element fabrication method is described below, taking an example of a polyvinyl alcohol resin film as the base material. There are no particular limitations as to the method for fabricating the polyvinyl alcohol resin film; known methods may be employed for fabrication. The fabricated method includes saponification of a polyvinyl acetate resin. Examples of the polyvinyl acetate resin include copolymers of vinyl acetate and other monomers copolymerizable therewith, and the like, in addition to polyvinyl acetate composed of a homopolymer of vinyl acetate. Examples of monomers for copolymerization with vinyl acetate may include unsaturated carboxylic acids, olefins, vinyl ethers, unsaturated sulfonic acids, and the like. The degree of saponification of the polyvinyl alcohol resin is normally on the order of 85-100 mol %, and is preferably 95 mol % or above. The polyvinyl alcohol resin may be further modified; for example, aldehyde-modified polyvinyl formal or polyvinyl acetal can be used as well. The degree of polymerization of the polyvinyl alcohol resin refers to the viscosity-average degree of polymerization, and can be calculated by methods widely known in the technical field. The degree of polymerization is typically about 1,000-10,000, and preferably about 1,500-6,000.

The film produced from the polyvinyl alcohol resin is employed as the original fabric film. There are no particular limitations as to the method for film production from the polyvinyl alcohol resin; widely known methods may be employed for film production. In this case, the polyvinyl alcohol resin film may contain plasticizers such as glycerin, ethylene glycol, propylene glycol, low-molecular weight polyethylene glycol, and the like. The amount of plasticizer is 5-20 wt %, preferably 8-15 wt %. There are no particular limitations as to the thickness of the original fabric film composed of the polyvinyl alcohol resin; the thickness may be, e.g., about 5 μm-150 μm, and preferably about 10 μm-100 μm.

The original fabric film obtained in the above manner is next subjected to a swelling step. For the swelling step, a process involving immersion for 30 seconds to 10 minutes in a solution at 20-50° C. is applied. Preferably, the solution is water. The stretching magnification may be adjusted to 1.00-1.50, and preferably 1.10-1.35. When a shorter time to fabricate the polarization element film is desired, the swelling step may be omitted, as swelling occurs during the pigment dyeing process as well.

The swelling step is performed by immersing the polyvinyl alcohol resin film in a solution at 20-50° C. for 30 seconds to ten minutes. Preferably, the solution is water. When shortening the time for manufacturing the polarization element, the swelling step can be omitted because the polyvinyl alcohol resin film swells during the process for dyeing the pigment as well.

After the swelling step, a dyeing step is carried out. In the dyeing step, impregnation can be accomplished using an azo compound (commonly called a dichroic dye) such as those indicated in Non-Patent Reference 1, and the like. Because impregnation with these azo compounds is a step that entails imparting color, it is employed as a dyeing step. Using, as azo compounds, the dyes disclosed in Non-Patent Reference 1, or azo compounds such as those represented by formula (1), formula (2), formula (3), formula (4), formula (5) or the like, the pigments can be adsorbed onto or impregnated into a polyvinyl alcohol film in the dyeing step. There are no particular limitations as to the dyeing step, provided that the method is one for inducing adsorption of pigments onto, or impregnation of pigments into, a polyvinyl alcohol film; the dyeing step may be carried out, for example, by immersing the polyvinyl alcohol resin film in a solution containing a dichroic dye. The solution temperature in this step is preferably 5-60° C., more preferably 20-50° C., and particularly preferably 35-50° C. The duration of immersion in the solution can be adjusted appropriately, and is preferably adjusted to from 30 seconds to 20 minutes, and more preferably 1-10 minutes. While the dyeing method preferably involves immersion in the solution, the process can also be carried out by applying the solution onto the polyvinyl alcohol resin film. The solution containing the dichroic dye can contain, as dyeing aids, sodium carbonate, sodium hydrogen carbonate, sodium chloride, sodium sulfate, anhydrous sodium sulfate, sodium tripolyphosphate, and the like. The amounts thereof can be adjusted to any desired concentration according to time and temperature, which depend on the dyeing properties of the dye; the respective contained amounts of each are preferably 0-5 wt %, more preferably 0.1-2 wt %. The azo compounds of the dichroic dyes disclosed in Non-Patent Reference 1 and the azo compounds represented by formula (1), formula (2), formula (3), formula (4), formula (5), etc., may be used in the form of a free acid, or as salts of the compounds. As such salts, there can be employed lithium salts, sodium salts, potassium salts, or other alkali metal salts, and ammonium salts, alkylamine salts, or other organic salts. Sodium salts are preferred.

After the dyeing step, a washing step (hereinafter "washing step 1") can be carried out before proceeding to the next step. The washing step 1 is a step for washing away the dye solvent deposited on the surfaces of the polyvinyl alcohol resin film during the dyeing step. By carrying out the washing step 1, migration of dye into the liquid used in next treatment can be minimized. In the washing step 1, water is typically employed. The preferred washing method includes immersion in the solution, but washing can also be accomplished by applying the solution to the polyvinyl alcohol resin film. While there are no particular limitations as to the duration of washing, 1-300 seconds is preferred, and 1-60 seconds is more preferred. The temperature of the solvent in the washing step 1 must be a temperature such that the hydrophilic polymer does not dissolve. The washing process typically takes place at 5-40° C. However, as the absence of the washing step 1 does not pose any problems in terms of capabilities, this step can be omitted.

After the dyeing step or the washing step 1, a step for impregnating a crosslinking agent and/or a waterproofing agent can be carried out. As crosslinking agents, there can be employed, for example, boric acid, borax, ammonium borate, or other boron compounds; glyoxal, glutaraldehyde, or other polyvalent aldehydes; polyvalent isocyanate compounds of biuret type, isocyanurate type, blocked type, or the like; or titanium compounds such as titanium oxysulfate, or the like. Additionally, ethylene glycol glycidyl ether, polyamide-epichlorohydrin, or the like can be employed. The waterproofing agent may include succinic peroxide, ammonium persulfate, calcium perchlorate, benzoin ethyl ether, ethylene glycol diglycidyl ether, glycerol diglycidyl ether, ammonium chloride, magnesium chloride, and the like; and boric acid is preferably used. The step for including crosslinking agents and/or waterproofing agents may be carried out using at least one or more types of the crosslinking agents and/or waterproofing agents indicated above. The solvent used at this time is preferably water, but is not limited thereto. The concentration of the crosslinking agent and/or waterproofing agent contained in the solvent in the step for including crosslinking agents and/or waterproofing agents, to take an example of boric acid, is preferably a concentration of 0.1-6.0 wt %, more preferably 1.0-4.0 wt %, with respect to the solvent. The solvent temperature in this step is preferably 5-70° C., more preferably 5-50° C. The preferred method for impregnating the crosslinking agent and/or waterproofing agent into the polyvinyl alcohol resin film includes immersion in the solution, but application or coating of the solution onto the polyvinyl alcohol resin film is acceptable as well. The treatment time in this step is preferably 30 seconds to 6 minutes, more preferably 1-5 minutes. However, impregnation by a crosslinking agent and/or waterproofing agent is not essential, and when it is desired to shorten the duration, or when crosslinking treatment or waterproofing treatment are unnecessary, this treatment step can be omitted.

After carrying out the dyeing step, the washing step 1, or the step for impregnating the crosslinking agent and/or waterproofing agent, a stretching step is carried out. The stretching step is a step for uniaxial stretching of the polyvinyl alcohol film. IN the stretching method, either a wet stretching method or a dry stretching method may be employed. The present invention is realized by a stretching magnification is 3 times or greater. Stretching desirably takes place at a stretching magnification of 3 times or greater, preferably 5 to 7 times.

In the case of a dry stretching method, when the heating medium for stretching is an air medium, stretching preferably takes place at the temperature of the air medium of ordinary temperature to 180° C. The treatment preferably takes place in an atmosphere with humidity of 20-95% RH. The heating methods may include an inter-roll zone stretching method, a roll-heated stretching method, a rolling stretching method, an infrared heated stretching method, and the like, but is not limited thereto. The stretching step may involve stretching in a single stage, or multi-stage stretching in two or more stages.

In the case of a wet stretching method, stretching takes place in water, a water-soluble organic solvent, or a mixed solvent thereof. The stretching process preferably takes place while immersed in a solution containing a crosslinking agent and/or a waterproofing agent. Examples of the crosslinking agent used herein may include boric acid, borax, ammonium borate, or other boron compounds; glyoxal, glutaraldehyde, or other polyvalent aldehydes; polyvalent isocyanate compounds of biuret type, isocyanurate type, blocked type, or the like; or titanium compounds such as titanium oxysulfate, or the like; additionally, ethylene glycol glycidyl ether, polyamide-epichlorohydrin, or the like can be also used. Examples of the waterproofing agent used herein include cited succinic peroxide, ammonium persulfate, calcium perchlorate, benzoin ethyl ether, ethylene glycol diglycidyl ether, glycerol diglycidyl ether, ammonium chloride, magnesium chloride, and the like. Stretching is carried out in a solution containing at least one or more of the crosslinking agents and/or waterproofing agents indicated above. The crosslinking agent is preferably boric acid. The concentration of the crosslinking agent and/or waterproofing agent in the stretching step is preferably, e.g., 0.5-15 wt %, more preferably 2.0-8.0 wt %. The stretching magnification is preferably 2-8 times, more preferably 5-7 times. Treatment preferably takes place at a stretching temperature of 40-60° C., more preferably 45-58° C. The duration of stretching is normally 30 seconds to 20 minutes, more preferably 2-5 minutes. The dry stretching step may involve stretching in a single stage, or multi-stage stretching in two or more stages.

After carrying out the stretching step, precipitation of the crosslinking agent and/or waterproofing agent, or adhesion of foreign matter, to the film surfaces sometimes occur; therefore, a washing step (hereinafter "washing step 2") can be carried out to wash the film surfaces. The duration of washing is preferably 1 second to 5 minutes. The preferred washing method is immersion in a washing solution, but washing can be accomplished through application or coating of the solution onto the polyvinyl alcohol resin film as well. The washing process can take place in a single stage, or by a multi-stage process of two or more stages. There are no particular limitations as to the solution temperature in the washing step, but the temperature is normally 5-50° C., preferably 10-40° C.

Examples of the solvents employed in the process steps mentioned up to this point may include water, dimethyl sulfoxide, N-methylpyrrolidone, methanol, ethanol, propanol, isopropyl alcohol, glycerol, ethylene glycol, propylene glycol, diethylene glycol, triethylene glycol, tetraethylene glycol, trimethylol propane, and other alcohols, ethylenediamine, diethylenetriamine, or other amines, and other solvents. A single or a mixture of these solvents can be used. Water is the most preferred solvent.

After the stretching step or the washing step 2, a drying step of the film is carried out. The drying step may be carried out through natural drying; or, to enhance drying efficiency, compression by rollers, elimination of surface moisture by an air knife or water-absorbent roll, and/or forced air drying can be carried out. The drying treatment is preferably carried out at a drying temperature of 20-100° C., and more preferably by drying treatment at 60-100° C. The duration of the drying treatment can be 30 seconds to 20 minutes, and is preferably 5-10 minutes.

Using the method described above makes it possible to obtain a polarization element characterized in that, using a base material containing a dichroic dye comprising an azo compound, the a* value and the b* value calculated in accordance with JIS-Z-8729 are such that the absolute values of the a* value and the b* value when the single transmittance is measured are no more than 1, the absolute values of the a* value and the b* value measured with two of the base materials being arranged in parallel with respect to the direction of the absorption axis are no more than 2, and the absolute values of the a* value and the b* value measured with two of the base materials being arranged orthogonally with respect to the direction of the absorption axis are no more than 2; and the single transmittance is 35-60%.

At a single transmittance of 35-60%, the polarization degree (also described as "ρy" below) of the polarization element thus obtained is preferably equal to or greater than the value resulting from formula (II). The polarization degree equal to or greater than that resulting from formula (II) makes it possible to maintain high transmittance, as well as a high polarization degree with respect to the transmittance. The polarization element more preferably has a polarization degree equal to or greater than that shown in formula (III).

[Numerical formula 2]

$$\rho y = -0.0906 \times Y_s^2 + 5.97 \times Y_s \qquad \text{Numerical formula (II)}$$

($Y_s$ represents the single transmittance, and $\rho y$ represents the degree of polarization.)

[Numerical formula 3]

$$\rho y = -0.0906 \times Y_s^2 + 5.97 \times Y_s + 1.0 \qquad \text{Formula (III)}$$

($Y_s$ represents the single transmittance, and $\rho y$ represents the degree of polarization.)

The polarization element thusly obtained is provided on one or both surfaces with a transparent protective film, to give a polarization plate. The transparent protective film may be provided as a coating polymer film, or as a film laminate layer. The transparent polymer or film forming the transparent protective film is preferably a transparent polymer or film of high mechanical strength and excellent thermal stability. Examples of the substances for use as the transparent protective film may include triacetyl cellulose, diacetyl cellulose, and other such cellulose acetate resins or films thereof; acrylic resins or films thereof; polyvinyl chloride resins or films thereof; nylon resins or films thereof; polyester resins or films thereof; polyarylate resins or films thereof; cyclic polyolefin resins of cyclic olefin monomers such as norbornene, or films thereof; polyethylene; polypropylene; polyolefins having a cyclo or norbornene skeleton, or copolymers thereof; resins or polymers having amide and/or imide main chains or side chains, or films thereof, and the like. A resin having liquid crystallinity, or a film thereof, can also be provided as the transparent protective film. The transparent protective film thickness is, for example, about 0.5 μm-200 μm. Polarization plates are fabricated by providing one or more layers of these resins or films of the same or different type, to one or both surfaces.

An adhesive is needed to adhere the transparent protective film to the polarization element. While there are no particular limitations as to the adhesive, polyvinyl alcohol adhesives are preferred. Non-limiting examples of polyvinyl alcohol adhesives include GOHSENOL NH-26 (Nippon Synthetic Chemical Industry Co. Ltd.), EXCEVAL RS-2117

(Kuraray Co. Ltd.), and the like. Crosslinking agents and/or waterproofing agents can be added to the adhesive. Where a maleic anhydride-isobutylene copolymer is employed as a polyvinyl alcohol adhesive, a crosslinking agent may be mixed with the adhesive, if needed, for use. Examples of maleic anhydride-isobutylene copolymers may include ISOBAM #18 (Kuraray Co. Ltd.), ISOBAM #04 (Kuraray Co. Ltd.), ammonia-modified ISOBAM #104 (Kuraray Co. Ltd.), ammonia-modified ISOBAM #110 (Kuraray Co. Ltd.), imidized ISOBAM #304 (Kuraray Co. Ltd.), imidized ISOBAM #310 (Kuraray Co. Ltd.), and the like. Water-soluble, polyvalent epoxy compounds can be employed as crosslinking agents in the process. Examples of water-soluble, polyvalent epoxy compounds may include DENAGOL EX-521 (Nagase Chemtex Corp.), TETRAD-C (Mitsubishi Gas Chemical Company Inc.), and the like. As adhesives other than polyvinyl alcohol resins, widely known urethane based, acrylic based, or epoxy based adhesives can be used. With the aim of improving the adhesive strength or improving the water resistance of the adhesive, additives such as zinc compounds, chlorides, iodides, and the like may be included simultaneously, in concentrations of about 0.1-10 wt %. There are no particular limitations as to additives. Once the transparent protective film has been adhered using the adhesive, a polarization plate is obtained through drying or heat treatment, at appropriate temperature.

In some instances, in the case of adhesion to a display device of, for example, liquid crystal or organic electroluminescent type (commonly known as OLED or OEL), or the like, the obtained polarization plate may be provided, on the surface of a protective layer or film subsequently serving as a non-exposed surface thereof, with layers of various functionalities for improving viewing angle and/or improving contrast, or with layers or films having luminance-improving properties. It is preferable to employ an adhesive when such a polarization plate is adhered to such a film or display device.

The polarization plate may also have on another surface thereof, i.e., on an exposed surface of the protective layer or film, an anti-reflection layer, an anti-glare layer, a hard coating layer, or other such widely known layers having various functionalities. While coating methods are the preferred method for fabrication of layers having various functionalities, films having such functions can be adhered via an adhesive or pressure-sensitive adhesive as well. The layers having various functionalities can also be layers or films for controlling phase differences.

Through the above methods, there can be provided a polarization element and polarization plate characterized in that, using a base material containing a dichroic dye comprising an azo compound, the a* value and the b* value calculated in accordance with JIS-Z-8729 are such that the absolute values of the a* value and the b* value when the single transmittance is measured are no more than 1, the absolute values of the a* value and the b* value measured with two of the base materials being arranged in parallel with respect to the direction of the absorption axis are no more than 2, and the absolute values of the a* value and the b* value measured with two of the base materials being arranged orthogonally with respect to the direction of the absorption axis are no more than 2; and the single transmittance is 35-600. Liquid crystal display devices employing the polarization element or polarization plate of the present invention have high reliability, as well as long-lasting high contrast and high color reproduction. In particular, because transparent electrodes made of indium tin oxide (ITO) and the like, aluminum, etc. are used as materials for driving electrodes in reflection liquid crystals, reflected light from these electrodes displays reflection intensities at individual wavelengths as shown in FIG. 1, and the reflected color produces a green color. The reflection intensities shown in FIG. 1 are the result of measurements using a spectrophotometer U-4100 (manufactured by Hitachi, Ltd.), the highest reflection intensity being converted to 100. Therefore, in order to correct the reflected color, it is preferable to adjust the a* value measured with two of the base materials forming the polarization element being arranged parallel to the absorption axis direction and the a* value are measured so that a slight red color is produced. The range of a* values measured with two of the base materials forming the polarization element being arranged parallel to the absorption axis direction is preferably −0.5 to 1.7, more preferably 0 to 1.5, and even more preferably 0.3 to 1.2.

The polarization elements or polarization plates of the present invention thus obtained may be provided, as needed, with a protective layer, or a functional layer and a support, or the like, and used in a liquid crystal projector, electronic calculator, clock, notebook PC, word processors, LCD TV, polarized lens, polarized glasses, car navigation unit, indoor/outdoor measuring instruments and indicators, or the like. In particular, the polarization elements or polarization plates may be utilized effectively in reflective liquid crystal display devices, semi-transmissive liquid crystal display devices, organic electroluminescent displays, and the like.

As one method of application, the polarization plate of the present invention may be used as a support-equipped polarization plate. The support is preferably one having a flat surface portion for the purpose of adhesion of the polarization plate. Moreover, as the intended purpose is for optical applications, molded glass components are preferred. Examples of the molded glass components may include glass sheets, lenses, prisms (e.g., triangular prisms or cubic prisms), and the like. A lens having an adhered polarization plate may be utilized as a polarization plate-equipped condenser lens, in a liquid crystal projector. A prism having an adhered polarization plate may be utilized as a polarization plate-equipped polarizing beam splitter, or as a polarization plate-equipped dichroic prism, in a liquid crystal projector. Adhesion to liquid crystal cells is also acceptable. Examples of the materials for the glass may include soda glass, borosilicate glass, inorganic bases of crystal, inorganic bases of sapphire, and other such inorganic glass, or sheets of acrylic, polycarbonate or other organic plastics; however, inorganic glass is preferred. The thickness and size of the glass sheet may be of the desired size. Glass-equipped polarization plates are preferably provided, on the glass surface or polarization surface thereof, or both, with an AR layer in order to further improve the single-plate light transmittance. A transparent adhesive (pressure-sensitive adhesive) is applied, for example, to the flat portion of such a support, and the polarization plate of the present invention is then adhered to this coated surface. Alternatively, an adhesive (pressure-sensitive adhesive) is applied to the polarization plate, and the support is then adhered to this coated surface. The transparent adhesive (pressure-sensitive adhesive) used here is preferably an acrylic acid ester based adhesive. Where the polarization plate is to be used as an elliptical polarization plate, a retardation plate side is normally adhered to the support side, but it is also acceptable that the polarization plate side is adhered to the molded glass component.

EXAMPLES

The present invention is described in further detail below through examples; however, the invention is not limited by these examples. The transmittance indicated in the examples was evaluated as follows.

The transmittance observed during measurement of a single polarization element or polarization plate is designated as transmittance Ts, the transmittance observed when two polarization elements or polarization plates are stacked with the absorption axis directions thereof aligned is designated as parallel transmittance Tp, and the transmittance observed when two polarization elements or polarization plates are stacked with the absorption axis directions thereof orthogonal is designated as orthogonal transmittance Tc.

The single transmittance Ys is computed according to the following formula (IV), by calculating the spectral transmittance $\tau\lambda$ at prescribed wavelength intervals $d\lambda$ (here, 10 nm) in the 400 nm-700 nm wavelength region. In the formula, PA represents a spectral distribution of a standard illuminant (C illuminant), and $y\lambda$ represents a two degree visual field color matching function.

[Numerical formula 4]

$$Y_s = \frac{\int_{400}^{700} P\lambda * y\lambda * \tau\lambda * d\lambda}{\int_{400}^{700} P\lambda * y\lambda * d\lambda} \quad \text{Formula (IV)}$$

The spectral transmittance $\tau\lambda$ was measured using a spectrophotometer (U-4100 manufactured by Hitachi, Ltd.).

The degree of polarization $\rho y$ was calculated from the parallel transmittance Tp and the orthogonal parallel transmittance Tc, using formula (V).

[Numerical formula 5]

$$Py = \{(Tp-Tc)/(Tp+Tc)\}^{1/2} \times 100 \quad \text{Formula (V)}$$

Further, the transmittance during irradiation with absolutely-polarized light was measured using a spectrophotometer (U-4100 manufactured by Hitachi Ltd.). When measuring transmittance, an iodine type polarization plate (SKN-18043P manufactured by Polatechno Co. Ltd.) having a degree of polarization of 99.99% and transmittance of 43% subsequent to luminosity factor correction was positioned at the light exit side based on JIS Z 8729 (C illuminant, two degree visual field), so that absolutely-polarized light being incident on the measurement sample. The protective layer of the iodine type polarization plate was triacetyl cellulose lacking a UV absorbing function.

Where Ky denotes the absolute parallel transmittance at individual wavelengths, obtained with absolutely-polarized light being incident on the polarization plate of the present invention, through measurements taken when the vibration direction of the absolutely-polarized light positioned and the absorption axis direction of the polarization plate of the present invention are orthogonal to one another (when the absorption axis of the absolutely-polarized light and the absorption axis of the polarization plate of the present invention are parallel), and Kz denotes the absolute orthogonal transmittance at individual wavelengths, obtained through measurements taken when the vibration direction of the absolutely-polarized light and the absorption axis direction of the polarization plate of the present invention are parallel to one another (when the absorption axis of the absolutely-polarized light and the absorption axis of the polarization plate of the present invention are orthogonal), Ky and Kz were measured at individual wavelengths.

Synthesis Example 1

17.9 parts 2-nitro-4-sulfoaniline was dissolved in 145 parts water, the resulting solution was added to 140 parts water containing 26 parts 35% hydrochloric acid, and 6.9 parts sodium nitrite was added at 15-20° C. over one hour, diazotizing the solution. Next, the diazotized solution was added to an aqueous solution containing 31.5 parts N,N-bis(1-hydroxy-3-sulfo-6-naphthyl)amine (common name: di-J acid), 125 parts water, and 11 parts soda ash, and coupling was then performed at 20° C. over three hours while adding a soda ash solution by pouring, the pH of the diazotized solution being maintained at 8.5-9.5, until no disazo compound was recognizable in a spot test, whereby a disazo compound was obtained. Next, a copper complex manufactured by adding 30.5 parts monoethanolamine to an aqueous solution of 25 parts copper sulfate was added to the disazo compound, and a copperization reaction was performed at 95° C. over 10 hours until no unreacted material was recognizable in thin-layer chromatography; 25 wt. %, with respect to a residual amount, of Sanuki salt was added to the resulting solution, which was then salted out and evaporated to dryness at 60° C., whereby the pigment in Compound Example 12 was obtained, the pigment having a structure of formula (2) of the present application.

Example 1

A polyvinyl alcohol film (VF-PS manufactured by Kuraray Co. Ltd.) having a saponification of 99% or greater and an average degree of polymerization of 2,400 was subjected to swelling treatment by immersion for two minutes in 45° C. hot water, at a stretching magnification of 1.30 times. The film having undergone swelling treatment was immersed for 3 minutes in an aqueous solution adjusted to 45° C., containing 1,500 weight parts of water, 1.5 weight part of sodium tripolyphosphate, 1.5 part of anhydrous sodium sulfate, 0.038 parts by weight of the dye described in Example 1 of Japanese Patent 4033443, the dye having a structure of formula (1); 0.17 parts by weight of the dye obtained as in Synthesis Example 1, the dye having a structure of formula (2); 0.105 parts by weight of the dye used in example 3 of Japanese Patent Application No. 2011-197600, the dye having a structure of formula (4); and 0.13 parts by weight of C.I. Direct Orange 39 having a structure of formula (5). The resulting film was immersed for one minute at 40° C. in an aqueous solution containing 20 g/L of boric acid (manufactured by Societa Chimica Larderello s.p.a). The resulting film was stretched for 5 minutes in a 50° C. aqueous solution containing 30.0 g/L of boric acid, the film being stretched at a stretching magnification of 5.0 times. The film obtained through boric acid treatment, while maintained in a tensioned state, was treated for 20 seconds in an aqueous solution adjusted to a potassium iodide content of 20 g/L, while held at 30° C. The treated film was subjected to a 9-minute drying treatment at 70° C., to obtain a polarization element according to the present invention. Using a polyvinyl alcohol based adhesive, the dried polarization element was laminated with an alkali-treated triacetyl cellulose film (TD-81U manufactured by Fuji Photographic Film Co. Ltd.), to obtain a polarization plate.

The obtained polarization plate was cut into 40 mm×40 mm pieces, and adhered to a 1 mm glass sheet with the pressure-sensitive adhesive PTR-3000 (manufactured by Nippon Kayaku Co. Ltd.), to produce specimens for measurement.

Example 2

Except that the swelled film was made to contain dye by immersion, for three minutes, in an aqueous solution adjusted to 45° C., the aqueous solution containing: 1500 parts by weight of water; 1.5 parts by weight of sodium tripolyphosphate; 1.5 parts by weight of anhydrous sodium sulfate; 0.038 parts by weight of the dye described in Example 1 of Japanese Patent No. 4033443, the dye having a structure of formula (1); 0.16 parts by weight of the dye shown in Synthesis Example 1 of Japanese Patent Application 2011-120722, the dye having a structure of formula (3); 0.105 parts by weight of the dye used in example 3 of Japanese Patent Application No. 2011-197600, the dye having a structure of formula (4); and 0.13 parts by weight of C.I. Direct Orange 39 having a structure of formula (5), a polarization element and a polarization plate were produced, and measurement samples were obtained in accordance with the same manner as in Example 1.

Example 3

Except that the swelled film was made to contain dye by immersion, for 4 minutes, in an aqueous solution adjusted to 45° C., the aqueous solution containing: 1500 parts by weight of water; 1.5 parts by weight of sodium tripolyphosphate; 1.5 parts by weight of anhydrous sodium sulfate; 0.038 parts by weight of the dye described in Example 1 of Japanese Patent No. 4033443, the dye having a structure of formula (1); 0.17 parts by weight of the dye obtained as in Synthesis Example 1, the dye having a structure of formula (2); 0.16 parts by weight of the dye shown in Synthesis Example 1 of Japanese Patent Application No. 2011-120722, the dye having a structure of formula (3); 0.105 parts by weight of the dye used in example 3 of Japanese Patent Application No. 2011-197600, the dye having a structure of formula (4); and 0.13 parts by weight of C.I. Direct Orange 39 having a structure of formula (5), a polarization element and a polarization plate were produced, and measurement samples were obtained in accordance with the same manner as in Example 1.

Example 4

Except that the swelled film was made to contain dye by subjecting to a dyeing step following immersion, for three minutes, in an aqueous solution adjusted to 45° C., the aqueous solution containing: 1500 parts by weight of water; 1.5 parts by weight of sodium tripolyphosphate; 1.5 parts by weight of anhydrous sodium sulfate; 0.023 parts by weight of the dye described in Example 1 of Japanese Patent No. 4033443, the dye having a structure of formula (1); 0.13 parts by weight of the dye obtained as in Synthesis Example 1, the dye having a structure of formula (2); 0.16 parts by weight of the dye shown in Synthesis Example 1 of Japanese Patent Application No. 2011-120722, the dye having a structure of formula (3); 0.12 parts by weight of the dye used in example 3 of Japanese Patent Application No. 2011-197600, the dye having a structure of formula (4); and 0.1 parts by weight of C.I. Direct Orange 39 having a structure of formula (5), a polarization element and a polarization plate were produced, and measurement samples were obtained in accordance with the same manner as in Example 1.

Examples 5 to 9

Except that a polyvinyl alcohol film (VF-XH #7500 manufactured by Kuraray) having an average degree of polymerization of 4000 was used instead of the polyvinyl alcohol film (VF-PS manufactured by Kuraray) having an average degree of polymerization of 2400, and the swelled film was compounded with a dye by being subjected to a dyeing step following immersion, for a discretionary length of time, in an aqueous solution adjusted to 45° C., the aqueous solution containing: 1500 parts by weight of water; 1.5 parts by weight of sodium tripolyphosphate; 1.5 parts by weight of anhydrous sodium sulfate; 0.035 parts by weight of the dye described in Example 1 of Japanese Patent No. 4033443, the dye having a structure of formula (1); 0.15 parts by weight of the dye obtained of Synthesis Example 1, the dye having a structure of formula (2); 0.16 parts by weight of the dye shown in Synthesis Example 1 of Japanese Patent Application No. 2011-120722, the dye having a structure of formula (3); 0.11 parts by weight of the dye used in example 3 of Japanese Patent Application No. 2011-197600, the dye having a structure of formula (4); and 0.12 parts by weight of C.I. Direct Orange 39 having a structure of formula (5), a polarization element and a polarization plate were produced, measurement samples were obtained in accordance with the same manner as in Example 1.

Comparative Example 1

Measurement samples were prepared in the same manner as in Example 1, except that an iodine based polarization plate not containing an azo compound was produced in accordance with the formulation of Comparative Example 1 of Japanese Laid-Open Patent Application 2008-065222.

Comparative Example 2

Except that a polarization element containing an azo compound only as dye was prepared in accordance with the method of Example 1 of Japanese Laid-Open Patent Application 11-218611, a polarization plate was fabricated and measurement samples were obtained in the same manner as in Example 1.

Comparative Example 3

Except that a polarization element containing an azo compound only as dye was prepared in accordance with the method of Example 3 in Japanese Patent 4162334, a polarization plate was fabricated in the same manner as in Example 1.

Comparative Example 4

Except that the dyeing time was changed and a polarization plate having Ys of approximately 50% was fabricated, a polarization plate was produced and measurement samples were obtained in the same manner as in Comparative Example 2.

Comparative Example 5

A super-contrast polarization plate SHC-125 (manufactured by Polatechno), typically displaying neutral colors, was subjected to the measurement.

Comparative Example 6

A generic paperwhite polarization plate SHC-115 (manufactured by Polatechno) characterized in that a white color is obtained during measurement with two of the base materials being arranged parallel to the direction of the absorption axis was subjected to the measurement.

Table 1 shows the results of measuring Ys, ρy, a*–s, b*–s, a*–p, b*–p, a*–c, and b*–c, as well as the color of the polarization plate as viewed when in a parallel arrangement and when in an orthogonal arrangement, in Examples 1-9 and Comparative Examples 1-6. The color of the polarization plate as viewed when in a parallel arrangement is basically white, and that when in an orthogonal arrangement is basically black; however, when, e.g., "yellow" is displayed in the table, this refers to yellowish white, and when "purple" is displayed in the table, this refers to purplish black.

TABLE 1

|  | Ys | ρy | a*-s | b*-s | a*-p | b*-p | a*-c | b*-c | Single-body transmittance at 410-750 nm | Color in a parallel arrangement | Color in an orthogonal arrangement |
|---|---|---|---|---|---|---|---|---|---|---|---|
| Example 1 | 49.90 | 75.12 | 0.29 | 0.12 | 1.12 | 0.47 | −0.83 | −0.56 | 51.03 | White | Black |
| Example 2 | 49.56 | 76.12 | −0.16 | 0.20 | 0.58 | 0.64 | −1.95 | −0.58 | 50.15 | White | Black |
| Example 3 | 43.52 | 92.32 | 0.28 | 0.16 | 0.82 | 0.14 | −0.71 | 0.70 | 44.14 | White | Black |
| Example 4 | 51.02 | 75.27 | 0.25 | 0.31 | 0.76 | 0.67 | −0.07 | 0.01 | 51.89 | White | Black |
| Example 5 | 39.39 | 99.2 | 0.48 | 0.11 | 1.02 | 0.11 | −0.66 | 0.49 | 40.58 | White | Black |
| Example 6 | 40.89 | 97.83 | 0.52 | 0.11 | 1.07 | 0.12 | −0.12 | 0.47 | 42.08 | White | Black |
| Example 7 | 42.22 | 95.45 | 0.48 | 0.14 | 0.98 | 0.10 | −0.13 | 0.97 | 43.52 | White | Black |
| Example 8 | 44.90 | 88.52 | 0.26 | 0.06 | 0.76 | 0.06 | −0.39 | 0.29 | 46.15 | White | Black |
| Example 9 | 46.87 | 82.63 | 0.13 | 0.11 | 0.63 | 0.00 | −0.63 | 0.52 | 48.20 | White | Black |
| Comparative example 1 | 41.43 | 99.99 | −1.93 | 4.34 | −3.22 | 7.78 | 0.00 | −0.02 | 41.27 | Yellow-green | Black |
| Comparative example 2 | 39.36 | 99.74 | −0.59 | 3.94 | −0.89 | 7.06 | 0.10 | 0.09 | 40.08 | Yellow | Black |
| Comparative example 3 | 39.76 | 99.89 | −1.76 | 3.91 | −3.04 | 7.06 | 0.58 | −1.30 | 39.65 | Yellow-green | Black |
| Comparative example 4 | 50.97 | 76.39 | −0.55 | 1.28 | −0.72 | 2.61 | −0.75 | 0.78 | 55.54 | Yellow | Black |
| Comparative example 5 | 39.54 | 99.75 | −0.31 | 3.38 | −0.37 | 6.14 | 0.07 | 0.07 | 40.08 | Yellow | Black |
| Comparative example 6 | 43.13 | 96.03 | −0.47 | 1.63 | −0.47 | 3.63 | −2.59 | −3.84 | 43.81 | Yellow | Purple |

Table 2 shows the average transmittance at 400 nm to 460 nm, the average transmittance at 550 nm to 600 nm, the average transmittance at 600 nm to 670 nm, the absolute value of the difference between the average transmittance at 400 nm to 460 nm and average transmittance at 550 nm to 600 nm, and the absolute value of the difference between the average transmittance 550 nm to 600 nm and the average transmittance at 600 nm to 670 nm, when absolutely-polarized light was incident in Examples 1 to 7 and Comparative Examples 1 to 4.

TABLE 2

|  | Average transmittance at 400-460 nm | | Average transmittance at 550-600 nm | | Average transmittance at 600-670 nm | | Absolute value of difference between average transmittance at 400-460 nm and average transmittance at 550-600 nm | | Absolute value of difference between average transmittance at 550-600 nm and average transmittance at 600-670 nm | |
|---|---|---|---|---|---|---|---|---|---|---|
|  | parallel arrangement | orthogonal arrangement | parallel arrangement | orthogonal arrangement | parallel arrangement | orthogonal arrangement | parallel arrangement | orthogonal arrangement | parallel arrangement | orthogonal arrangement |
| Example 1 | 86.74 | 13.85 | 87.58 | 12.25 | 88.94 | 12.32 | 0.84 | 1.60 | 1.35 | 0.07 |
| Example 2 | 86.51 | 13.06 | 87.54 | 11.56 | 88.42 | 10.41 | 1.03 | 1.50 | 0.88 | −1.15 |
| Example 3 | 83.33 | 4.02 | 83.65 | 3.35 | 85.16 | 2.94 | 0.32 | 0.66 | 1.51 | −0.41 |
| Example 4 | 88.39 | 13.59 | 88.90 | 12.16 | 89.95 | 11.89 | 0.51 | 1.43 | 1.05 | −0.27 |
| Example 5 | 77.93 | 0.41 | 78.30 | 0.33 | 80.32 | 0.22 | 0.36 | 0.09 | 2.02 | −0.11 |
| Example 6 | 80.43 | 1.17 | 80.79 | 0.90 | 82.68 | 0.76 | 0.36 | 0.26 | 1.90 | −0.14 |
| Example 7 | 82.12 | 2.33 | 82.46 | 1.93 | 84.28 | 1.77 | 0.34 | 0.41 | 1.82 | −0.16 |
| Example 8 | 84.33 | 6.07 | 84.58 | 5.07 | 86.03 | 4.83 | 0.25 | 1.00 | 1.45 | −0.24 |
| Example 9 | 85.36 | 9.20 | 85.51 | 7.95 | 86.81 | 7.83 | 0.15 | 1.25 | 1.30 | −0.12 |

TABLE 2-continued

| | Average transmittance at 400-460 nm | | Average transmittance at 550-600 nm | | Average transmittance at 600-670 nm | | Absolute value of difference between average transmittance at 400-460 nm and average transmittance at 550-600 nm | | Absolute value of difference between average transmittance at 550-600 nm and average transmittance at 600-670 nm | |
|---|---|---|---|---|---|---|---|---|---|---|
| | parallel arrangement | orthogonal arrangement | parallel arrangement | orthogonal arrangement | parallel arrangement | orthogonal arrangement | parallel arrangement | orthogonal arrangement | parallel arrangement | orthogonal arrangement |
| Comparative example 1 | 64.23 | 0.03 | 82.40 | 0.01 | 83.49 | 0.01 | 18.17 | 0.02 | 1.10 | 0.00 |
| Comparative example 2 | 71.94 | 0.15 | 80.08 | 0.11 | 80.75 | 0.12 | 8.14 | 0.04 | 0.67 | 0.01 |
| Comparative example 3 | 64.49 | 0.14 | 79.72 | 0.01 | 80.57 | 0.18 | 15.24 | 0.13 | 0.85 | 0.17 |
| Comparative example 4 | 85.79 | 13.59 | 87.90 | 12.16 | 88.95 | 11.89 | 2.11 | 1.43 | 1.05 | −0.27 |
| Comparative example 5 | 72.09 | 0.12 | 80.21 | 0.11 | 80.76 | 0.10 | 8.12 | 0.02 | 0.55 | 0.00 |
| Comparative example 6 | 80.26 | 2.35 | 85.37 | 1.17 | 85.31 | 1.09 | 5.11 | 0.64 | −0.05 | −0.62 |

In Example 3, the dyeing step was performed for a discretionary length of time, and a polarization plate was produced that had a Ys value of 35-60%. Table 3 shows the Ys and ρy values of samples 1 to 15 resulting from this polarization plate, and those of Examples 5 to 9.

TABLE 3

| | Ys | ρy |
|---|---|---|
| Sample 1 | 41.74 | 94.82 |
| Sample 2 | 44.12 | 89.10 |
| Sample 3 | 43.52 | 92.32 |
| Sample 4 | 49.90 | 75.12 |
| Sample 5 | 49.88 | 74.53 |
| Sample 6 | 50.89 | 71.44 |
| Sample 7 | 49.88 | 74.90 |
| Sample 8 | 48.31 | 79.92 |
| Sample 9 | 50.58 | 72.80 |
| Sample 10 | 49.29 | 76.65 |
| Sample 11 | 49.50 | 76.49 |
| Sample 12 | 50.02 | 75.27 |
| Sample 13 | 49.56 | 76.12 |
| Sample 14 | 36.12 | 99.99 |
| Sample 15 | 54.20 | 61.00 |
| Example 5 | 39.39 | 99.2 |
| Example 6 | 40.89 | 97.83 |
| Example 7 | 42.22 | 95.45 |
| Example 8 | 44.90 | 88.52 |
| Example 9 | 46.87 | 82.63 |

Durability Test

The polarization plates obtained in Examples 1 to 9 and Comparative Examples 1 to 6 were exposed to an environment of 85° C. and relative humidity of 85% RH for 240 hours. In the sample of Comparative Example 1, transmittance and b*-c were changed to 44.17% and to −9.1, respectively, and visually observed color was changed to blue; in particular, when the polarization plates were positioned orthogonally, an intense blue color was apparent. By contrast, in the samples of Examples 1 to 9 and Comparative Examples 2 to 6, no change was observed in transmittance or in hue.

As may be appreciated from the measurement results of Ys, ρy, a*-s, b*-s, a*-p, b*-p, a*-c, and b*-c in Examples 1 to 9 and Comparative Examples 1 to 6 as shown in Table 1, according to the present invention, there is provided a polarization element or polarization plate characterized in that, using a base material containing a dichroic dye formed from an azo compound, the a* value and the b* value calculated in accordance with JIS-Z-8729 are such that the absolute values of the a* value and the b* value when the single transmittance is measured are no more than 1, the absolute values of the a* value and the b* value measured with two of the base materials being arranged in parallel with respect to the direction of the absorption axis are no more than 2, and the absolute values of the a* value and the b* value measured with two of the base materials being arranged orthogonally with respect to the direction of the absorption axis are no more than 2; and the single transmittance is 35-60%. Further, the polarization element or polarization plate results in achromatic white and black being displayed in cases when white is displayed in a parallel arrangement and when black is displayed in an orthogonal arrangement, respectively. From the transmittance at individual wavelengths, it shall be apparent that a polarization plate in which an adjustment has been made in regard to the transmittance of individual wavelengths during irradiation with polarized light, the absolutely polarized form of which having a vibration direction orthogonal to the absorption axis direction of the base material polarization element, such that the absolute value of the difference between the average transmittance at 550 nm to 600 nm and at 400 nm to 460 nm is no more than 4%, and the absolute value of the difference between the average transmittance at 600 nm to 670 nm and the average transmittance at 550 nm to 600 nm is no more than 3%; and the transmittance of individual wavelengths during irradiation with polarized light, the absolutely polarized form of which having a vibration direction parallel to the absorption axis direction of the base material polarization element, such that the absolute value of the difference between the average transmittance at 550 nm to 600 nm and at 400 nm to 460 nm is no more than 2%, and the absolute value of the difference between the average transmittance at 600 nm to 670 nm and the average transmittance at 550 nm to 600 nm is no more than 2%, displays achromatic color when in a parallel arrangement and when in an orthogonal arrangement. As shall be apparent from the results shown in Table 3, a polarization plate satisfying formula (I) was obtained in the present invention, the polarization plate having an excellent polarization degree with respect to the transmittance. The resultant polarization plates can express achromatic white when the polarization element is arranged parallel to an absorption axis, and can express achromatic black when the polarization element is arranged orthogonal to the absorption axis, while having high transmittance, and furthermore has high durability. The polarization element or polarization plate of the present invention has high durability that could not be obtained using an iodine-based polarization plate, and has achromatic white when in a parallel arrangement and achromatic black when in an orthogonal arrangement, even after a durability test was applied. A liquid crystal display device in which the polarization element or polarization plate of the present invention is used not only has high brightness and high contrast, but also is highly reliable and has high contrast and high color reproducibility over an extended period of time.

The invention claimed is:

1. A polarization element comprising a stretched base material containing a dichroic dye that is an azo compound, wherein the polarization element is characterized in that:

a* value and b* value of a hue calculated in accordance with JIS-Z-8729 are such that absolute values of the a* value and the b* value when the single transmittance is measured are no more than 1, absolute values of the a* value and the b* value measured with two of the base materials being arranged in parallel with respect to an absorption axis direction are no more than 2, and absolute values of the a* value and the b* value measured with two of the base materials being arranged orthogonally with respect to an absorption axis direction are no more than 2; and the single transmittance is 35-60%, wherein the base material contains a plurality of azo compounds, and wherein the plurality of azo compounds comprises an azo compound represented by formula (1) or a salt thereof, and an azo compound represented by formula (2) or a salt thereof; or an azo compound represented by formula (1) or a salt thereof, and an azo compound represented by formula (3) or a salt thereof:

Formula (1)

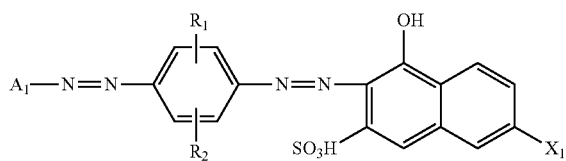

(wherein $A_1$ represents a phenyl group or naphthyl group having a substituent group; $R_1$ and $R_2$ each independently represent a hydrogen atom, a lower alkyl group, a lower alkoxy group, a sulfo group, or a lower alkoxy group having a sulfo group; and $X_1$ represents a phenylamino group optionally having a substituent group);

Formula (2)

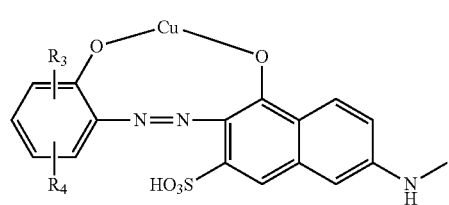

-continued

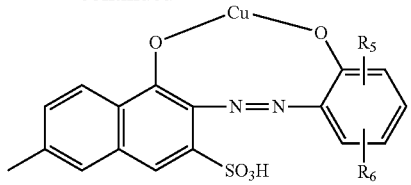

(wherein each of $R_3$ to $R_6$ independently represents a hydrogen atom, a lower alkyl group, a lower alkoxy group, a sulfo group, a lower alkoxy group having a sulfo group, a carbonyl group, or a halogen atom);

Formula (3)

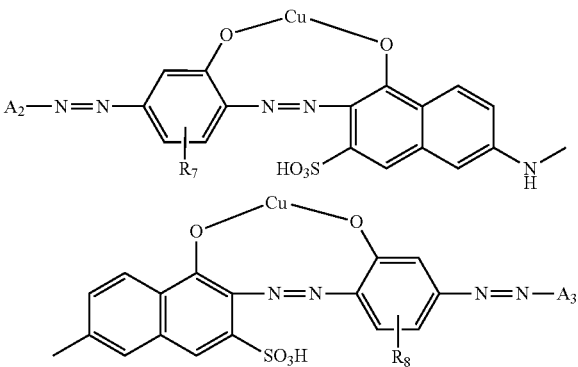

(wherein each of $A_2$ and $A_3$ independently represents a naphthyl group or phenyl group of which at least one substituent group is a sulfo group, lower alkyl group, lower alkoxy group, lower alkoxy group having a sulfo group, carboxy group, nitro group, amino group, or substituted amino group; and each of $R_7$ and $R_8$ independently represents a hydrogen atom, a lower alkyl group, a lower alkoxy group, a sulfo group, or a lower alkoxy group having a sulfo group).

2. The polarization element according to claim 1, characterized in that:

transmittance of individual wavelengths during irradiation with polarized light, an absolutely polarized form of which having a vibration direction orthogonal to the absorption axis direction of an base material polarization element, is such that an absolute value of difference between average transmittance at 550 nm to 600 nm and average transmittance at 400 nm to 460 nm is no more than 4%, and an absolute value of difference between average transmittance at 600 nm to 670 nm and average transmittance at 550 nm to 600 nm is no more than 3%; and transmittance of individual wavelengths during irradiation with polarized light, an absolutely polarized form of which having a vibration direction parallel to the absorption axis direction of a base material polarization element, is such that an absolute value of difference between average transmittance at 550 nm to 600 nm and average transmittance at 400 nm to 460 nm is no more than 2%, and an absolute value of difference between average transmittance at 600 nm to 670 nm and average transmittance at 550 nm to 600 nm is no more than 2%.

3. The polarization element according to claim 1, characterized in containing an azo compound selected from an azo compound represented by formula (4), a salt thereof, or a transition metal complex thereof:

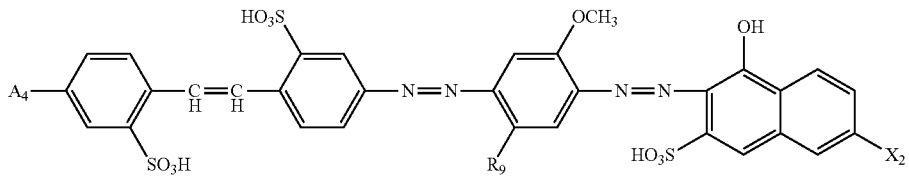

Formula (4)

(wherein $A_4$ represents a nitro group or an amino group; $R_9$ represents a hydrogen atom, a hydroxyl group, a lower alkyl group, a lower alkoxy group, a sulfo group, or a lower alkoxy group having a sulfo group; and $X_2$ represents a phenylamino group optionally having a substituent group).

4. The polarization element according to claim 3, characterized in that the azo compound represented by formula (4) is a copper complex.

5. The polarization element according to claim 3, characterized in that the $A_4$ substituent group in formula (4) is a nitro group.

6. The polarization element according to claim 1, characterized in containing an azo compound represented by formula (5), or a salt thereof:

(wherein each of $A_2$ and $A_3$ independently represents a naphthyl group or phenyl group of which at least one substituent group is a sulfo group, lower alkyl group, lower alkoxy group, lower alkoxy group having a sulfo group, carboxy group, nitro group, amino group, or substituted amino group; and each of $R_7$ and $R_8$ independently represents a hydrogen atom, a lower alkyl group, a lower alkoxy group, a sulfo group, or a lower alkoxy group having a sulfo group).

10. The polarization element according to claim 1, characterized in that the base material comprises a polyvinyl alcohol resin film.

Formula (5)

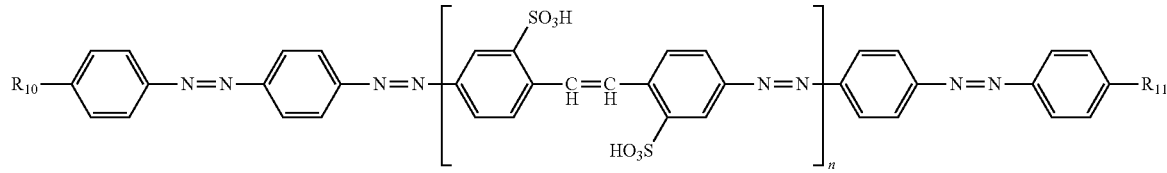

(wherein $R_{10}$ and $R_{11}$ each independently represent a sulfo group, a carboxy group, a hydroxy group, a lower alkyl group, or a lower alkoxyl group; and n represents an integer from 1 to 3).

7. The polarization element according to claim 1, characterized in that $A_1$ in formula (1) is a phenyl group having a substituent group.

8. The polarization element according to claim 1, characterized in that $A_2$ and $A_3$ in formula (3) are naphthyl groups having sulfo groups.

9. The polarization element according to claim 1, wherein the plurality of azo compounds comprises an azo compound represented by formula (1) or a salt thereof, and an azo compound represented by formula (2) or a salt thereof, and wherein said polarization element further contains an azo compound represented by formula (3) or a salt thereof:

11. The polarization element according to claim 1, characterized by having a single transmittance of 35-60%, and a polarization degree equal to or greater than a value obtained using numerical formula (I):

$$\rho y = -0.0906 \times Ys^2 + 5.97 \times Ys \qquad \text{Numerical Formula (I)}$$

(wherein Ys represents the single transmittance, and $\rho y$ represents the degree of polarization).

12. A polarization plate comprising a support film furnished to at least one surface of the polarization element according to claim 1.

13. A liquid crystal display device comprising the polarization plate according to claim 12.

Formula (3)

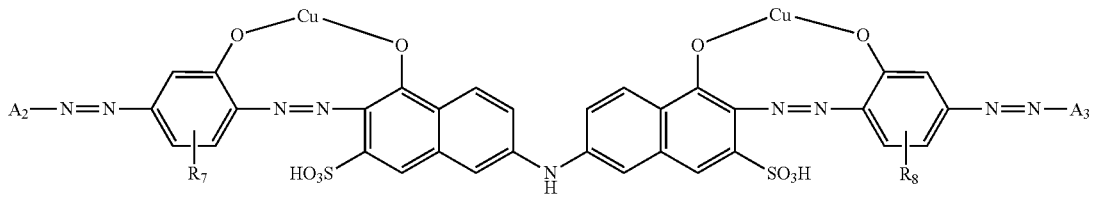

14. A liquid crystal display device comprising the polarization element according to claim 1.

\* \* \* \* \*